US012596974B2

(12) United States Patent
Jönsson et al.

(10) Patent No.: US 12,596,974 B2
(45) Date of Patent: Apr. 7, 2026

(54) MULTI-LAYER ABRASIVE TOOLS FOR CONCRETE SURFACE PROCESSING

(71) Applicant: HUSQVARNA AB, Huskvarna (SE)

(72) Inventors: Andreas Jönsson, Hallsberg (SE);
Joakim Leff-Hallstein, Mölndal (SE);
Robert Nyström, Gothenburg (SE);
Martin Huber, Lerum (SE); **Christian
Nyberg, Västra Frölunda (SE); Gustav
Berggren, Huskvarna (SE); Ulrika
Sköld, Huskvarna (SE); Cathérine
Königk, Huskvarna (SE); Mikael
Stuhrmann, Norrköping (SE); Mats
Lawenius, Gothenburg (SE); Per
Sandström**, Linköping (SE)

(73) Assignee: HUSQVARNA AB, Huskvarna (SE)

( * ) Notice: Subject to any disclaimer, the term of this patent is extended or adjusted under 35 U.S.C. 154(b) by 455 days.

(21) Appl. No.: 17/916,639

(22) PCT Filed: Mar. 1, 2021

(86) PCT No.: PCT/SE2021/050169
§ 371 (c)(1),
(2) Date: Oct. 3, 2022

(87) PCT Pub. No.: WO2021/206603
PCT Pub. Date: Oct. 14, 2021

(65) Prior Publication Data
US 2023/0153717 A1 May 18, 2023

Related U.S. Application Data

(63) Continuation of application No. 16/842,582, filed on Apr. 7, 2020, now Pat. No. 11,494,716.

(51) Int. Cl.
B24B 41/02 (2006.01)
B24B 53/02 (2012.01)
(Continued)

(52) U.S. Cl.
CPC ....... *G06Q 10/06313* (2013.01); *B24B 53/02* (2013.01); *G05B 19/182* (2013.01);
(Continued)

(58) Field of Classification Search
None
See application file for complete search history.

(56) References Cited

U.S. PATENT DOCUMENTS

| | | | |
|---|---|---|---|
| 3,121,981 A | 2/1964 | Edward | |
| 6,780,369 B1 * | 8/2004 | Darrow | E04F 21/242 |
| | | | 264/333 |

(Continued)

FOREIGN PATENT DOCUMENTS

| | | |
|---|---|---|
| CN | 106346379 A | 1/2017 |
| EP | 2829658 A1 | 1/2015 |

(Continued)

OTHER PUBLICATIONS

K. Tham, S. Hinata and S. Saito, "Effect of topological bumpy surface underlayer on compositionally modulated atomic layer stacking for high Ku Co80Pt20 film with closed-packed orientation," 2015 IEEE International Magnetics Conference (INTERMAG), Beijing, China, 2015 (Year: 2015).*

(Continued)

*Primary Examiner* — Jerry O'Connor
*Assistant Examiner* — Philip N Warner
(74) *Attorney, Agent, or Firm* — Burr & Forman

(57) ABSTRACT

An abrasive tool for a floor grinder, wherein the tool extends along a wear direction (D) from a grinding surface (G) to a mounting surface (M), wherein the abrasive tool comprises at least two sections (410, 420, 430) separated by a surface (P) transversal to the wear direction (D), where the at least two sections comprise respective abrasive materials associated with different grit sizes, where the section located closer (Continued)

to the grinding surface (G) is associated with a larger grit size compared to the section located closer to the mounting surface (M).

23 Claims, 11 Drawing Sheets

(51) Int. Cl.

| | | |
|---|---|---|
| *G05B 19/18* | (2006.01) |
| *G06Q 10/0631* | (2023.01) |
| *G06Q 10/0875* | (2023.01) |
| *G06Q 30/0204* | (2023.01) |
| *G06Q 30/0601* | (2023.01) |
| *G06Q 50/08* | (2012.01) |

(52) U.S. Cl.

CPC . *G06Q 10/06315* (2013.01); *G06Q 10/06316* (2013.01); *G06Q 10/0875* (2013.01); *G06Q 30/0205* (2013.01); *G06Q 30/0633* (2013.01); *G06Q 50/08* (2013.01); *G05B 2219/37355* (2013.01)

(56) References Cited

U.S. PATENT DOCUMENTS

| | | | |
|---|---|---|---|
| 7,810,417 B2 | 10/2010 | Onozuka et al. | |
| 11,135,721 B2* | 10/2021 | Bryner | B25J 9/1664 |
| 11,250,703 B2 | 2/2022 | Grace et al. | |
| 2002/0066600 A1 | 6/2002 | Dvorachek | |
| 2006/0110229 A1 | 5/2006 | Schnell et al. | |
| 2009/0032138 A1 | 2/2009 | Alleman et al. | |
| 2009/0093195 A1* | 4/2009 | Sung | B24D 3/007 |
| | | | 51/300 |
| 2009/0221212 A1* | 9/2009 | Palushaj | A46D 1/0238 |
| | | | 451/28 |
| 2011/0223845 A1 | 9/2011 | Van Der Veen et al. | |
| 2014/0352106 A1 | 12/2014 | King, Jr. | |
| 2016/0001423 A1* | 1/2016 | Esteban | B24D 11/005 |
| | | | 451/527 |
| 2016/0095487 A1* | 4/2016 | Koura | A47L 9/1418 |
| | | | 429/99 |
| 2016/0259341 A1 | 9/2016 | High et al. | |
| 2016/0375570 A1 | 12/2016 | Boeck et al. | |
| 2017/0008102 A1 | 1/2017 | Ishikawa et al. | |
| 2017/0109874 A1 | 4/2017 | Hallasch et al. | |
| 2017/0144304 A1* | 5/2017 | Guerin | B25J 9/1664 |
| 2018/0193981 A1* | 7/2018 | Schuster | B24D 9/08 |
| 2018/0369981 A1 | 12/2018 | Craft et al. | |
| 2019/0217445 A1* | 7/2019 | Kawahara | B24B 5/40 |
| 2019/0314946 A1 | 10/2019 | Dey, IV et al. | |
| 2020/0030880 A1 | 1/2020 | Nagahama et al. | |
| 2020/0055159 A1 | 2/2020 | Sakai et al. | |
| 2020/0180107 A1* | 6/2020 | Breitenmoser | B24B 55/105 |
| 2020/0198091 A1* | 6/2020 | Wetherell | B24B 7/226 |
| 2020/0308854 A1* | 10/2020 | Schubart | E04G 21/16 |
| 2021/0308825 A1* | 10/2021 | Gabriel | B24B 49/10 |
| 2022/0154747 A1* | 5/2022 | Caselli | E04B 1/82 |

FOREIGN PATENT DOCUMENTS

| | | | |
|---|---|---|---|
| EP | 3202537 A1 | 8/2017 | |
| JP | 2016176203 A | 10/2016 | |
| JP | 2017148874 A | 8/2017 | |
| WO | WO-9845092 A1 * | 10/1998 | B24D 7/066 |
| WO | 02064313 A1 | 8/2002 | |
| WO | 2012036026 A1 | 3/2012 | |
| WO | 2017151498 A1 | 9/2017 | |
| WO | 2018118596 A2 | 6/2018 | |
| WO | 2019176733 A1 | 9/2019 | |
| WO | 2020044157 A1 | 3/2020 | |

OTHER PUBLICATIONS

International Search Report and Written Opinion for International Application No. PCT/SE2021/050169 mailed May 5, 2021.
International Search Report and Written Opinion for International Application No. PCT/IB2021/052746 mailed Jul. 5, 2021.

\* cited by examiner

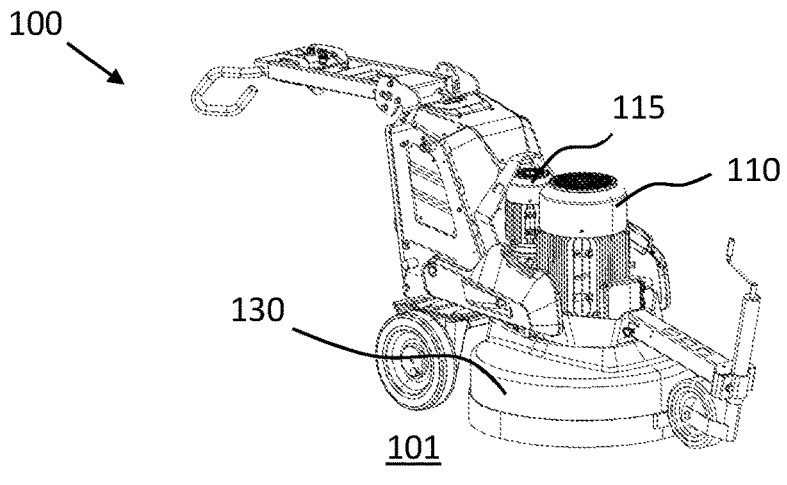
FIG. 1A
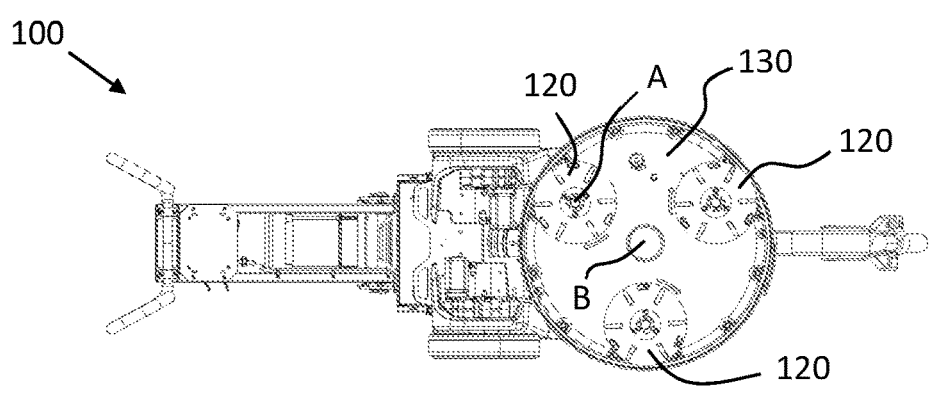
FIG. 1B
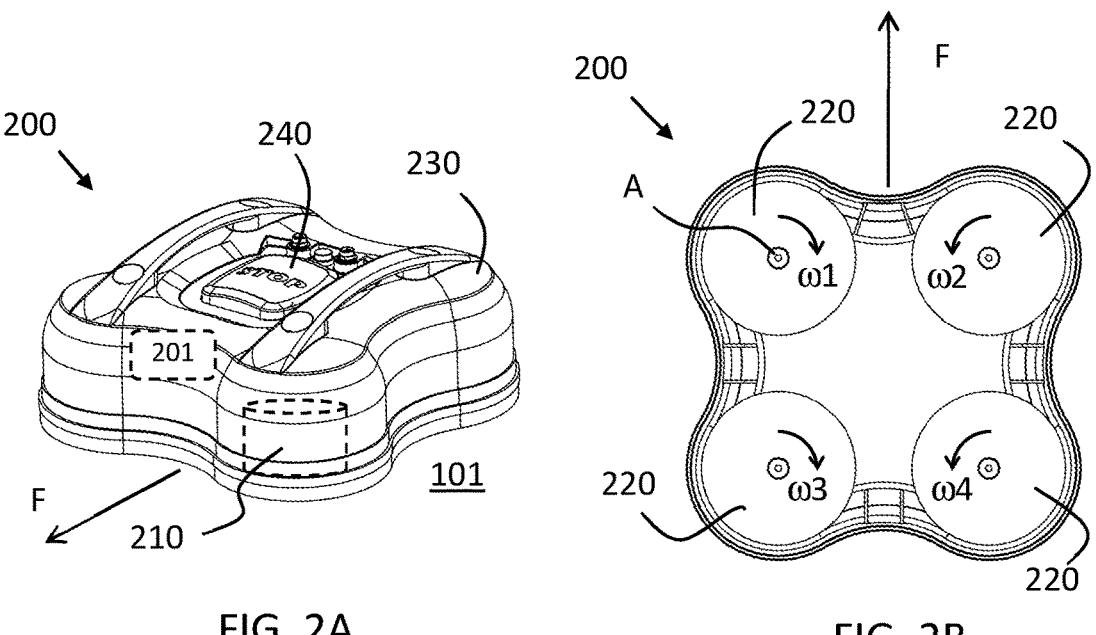
FIG. 2A
FIG. 2B course grit segment          medium grit segment          fine grit segment

1100

700

1040

1200

1020 tools required:

35 pcs    35 pcs tool cost: €12345 work schedule:    1210

1220 now    T

1010

1030

1300

101

1340

1520

L

R

1530

1310

H

1340

1350

1350

1350

1320

1330 detected distance [m]

measurement index

FIG. 13

1400
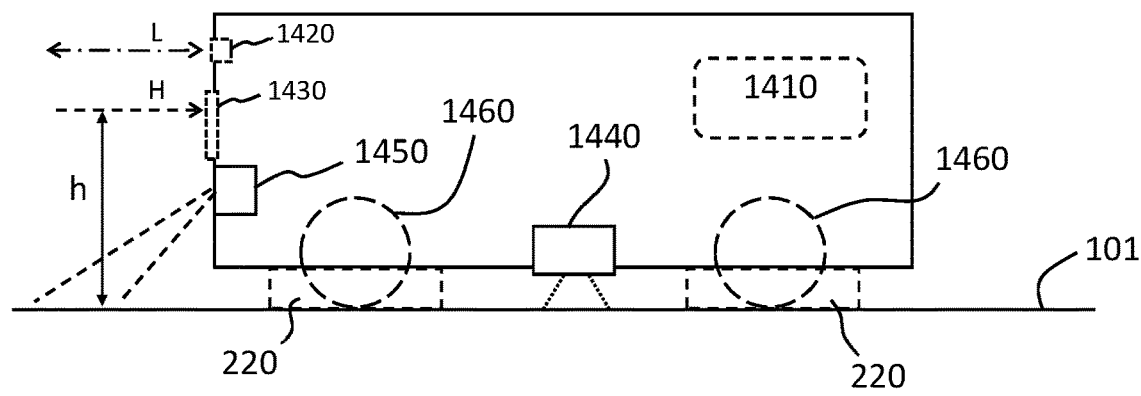
FIG. 14
FIG. 15

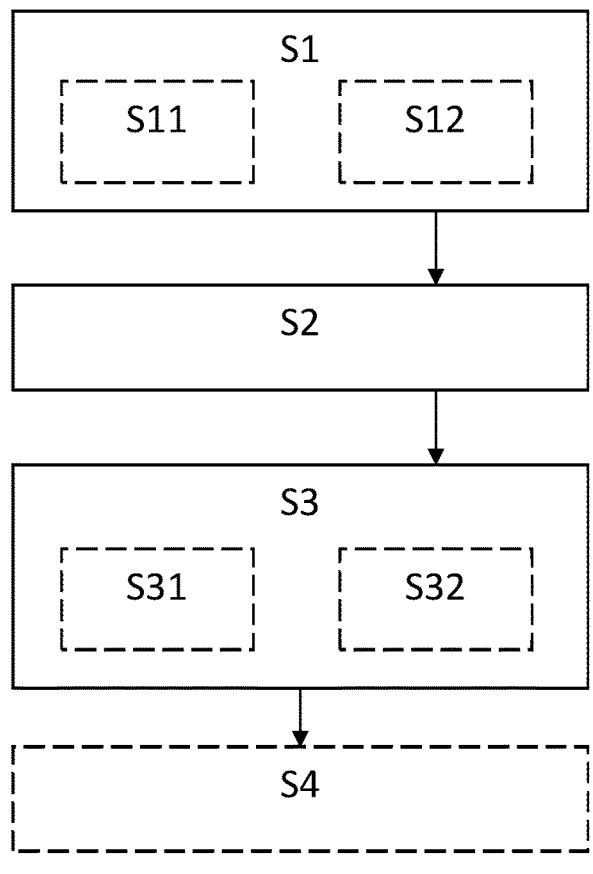
FIG. 16
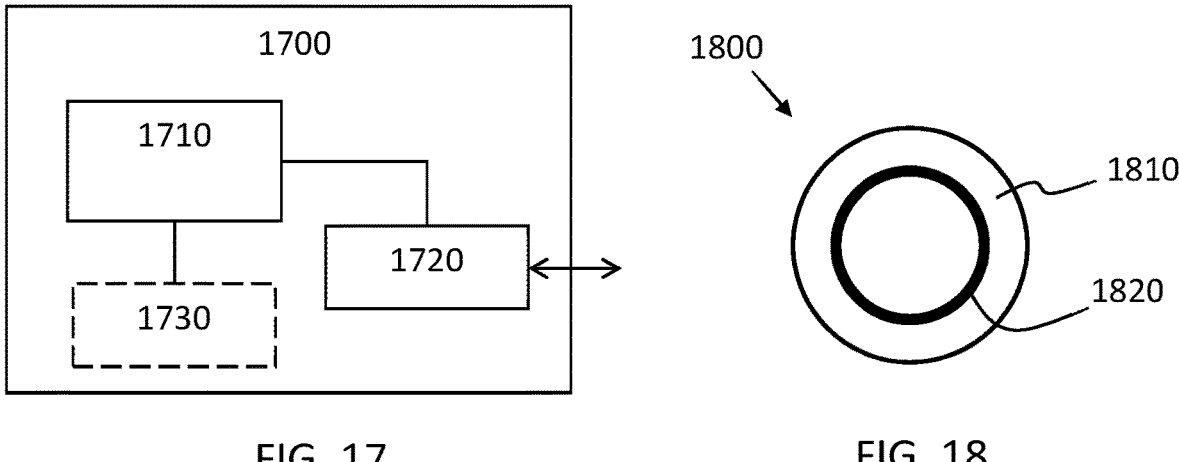
FIG. 17                          FIG. 18

Figures 19, 20:
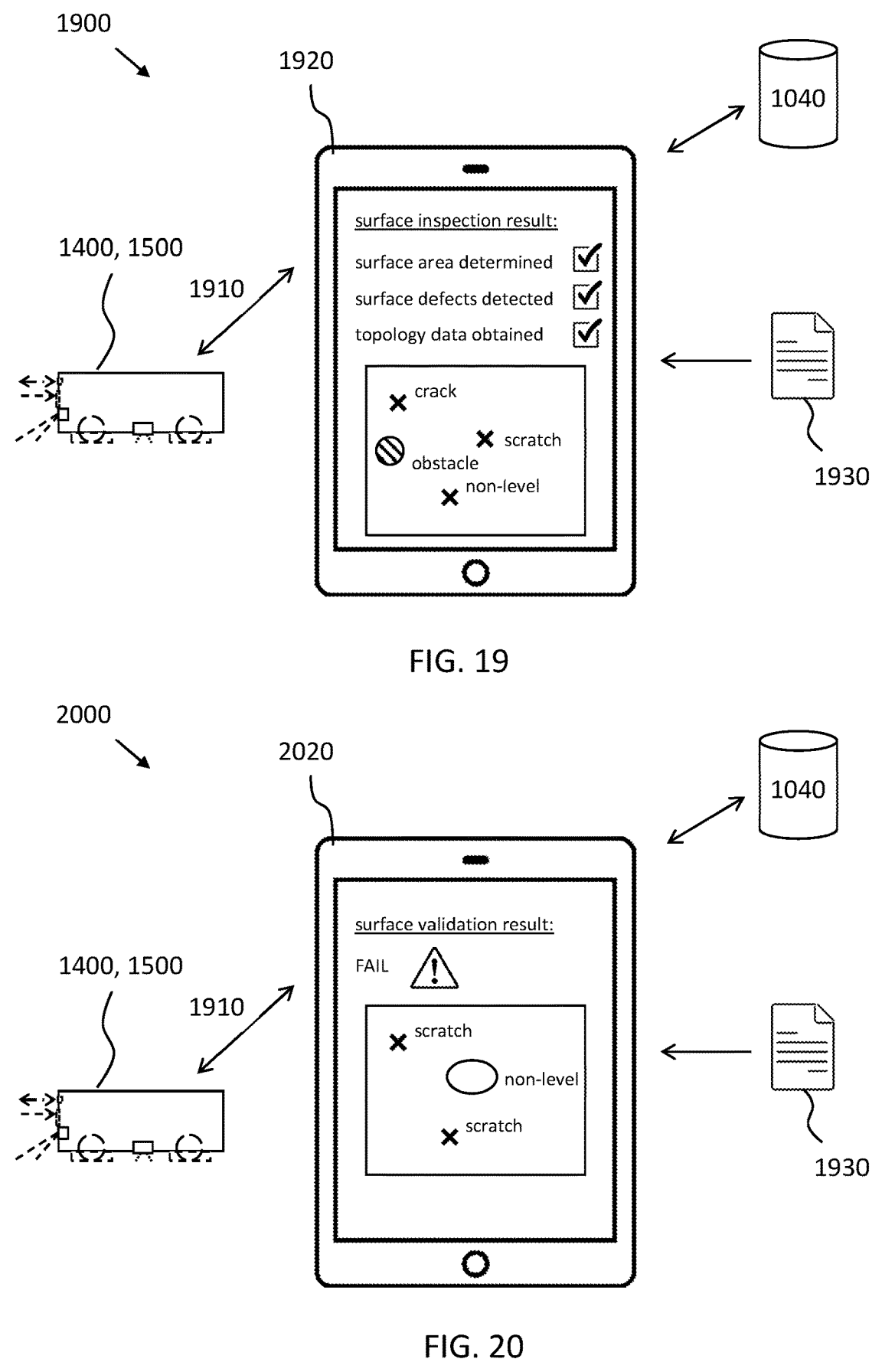

1900

1920

1400, 1500

1910

1040 surface inspection result:

surface area determined ☑ surface defects detected ☑ topology data obtained ☑

✕ crack

✕ scratch

🚫 obstacle

✕ non-level

1040 surface validation result:

FAIL ⚠️

✕ scratch

⬭ non-level

✕ scratch

MULTI-LAYER ABRASIVE TOOLS FOR CONCRETE SURFACE PROCESSING

TECHNICAL FIELD

The present disclosure relates to floor grinders for processing concrete surfaces. There are disclosed abrasive tools for use in grinding and polishing concrete surfaces, and also grinding machines, surface inspection machines, methods, control units, and systems for abrasive processing of concrete surfaces.

BACKGROUND

Concrete surfaces are commonly used for flooring in both domestic and industrial facilities. The size of concrete surface floors ranges from a few square meters for a domestic garage floor to thousands of square meters in larger industrial facilities. Concrete surfaces offer a cost efficient and durable flooring alternative and have therefore gained popularity over recent years.

A floor grinder can be used to efficiently process a concrete surface in order to, e.g., obtain a level surface having a uniform topology and/or a surface having a desired surface texture. Floor grinders can also be used to polish concrete surface in order to obtain a glossy surface finish.

Floor grinding is normally performed in steps, where abrasive tools of decreasing grit size, i.e., finer, and finer grit, are used in sequence to first obtain an efficient removal of material and then a smooth concrete surface. The concrete surface processing operation may also comprise polishing, where a very fine grit polishing tool is used to obtain a glossy surface texture.

A tool change is required at the beginning of each processing step, where the courser grit tool is removed to be replaced by a finer grit tool to be used during the next phase of the concrete surface processing operation. This tool change may be cumbersome and takes time. A more efficient concrete surface processing method is desired.

SUMMARY

It is an object of the present disclosure to provide improved machines and abrasive tools for floor grinding.

This object is obtained by an abrasive tool for a floor grinder. The tool extends along a wear direction from a grinding surface to a mounting surface. The abrasive tool comprises at least two sections separated by a surface transversal to the wear direction. At least two sections comprise respective abrasive materials associated with different grit sizes, where the section located closer to the grinding surface is associated with a larger grit size compared to the section located closer to the mounting surface. This way the course grit section first contacts the concrete surface. As this course grit section is worn down, the finer grit section eventually starts to contact the surface. Thus, a plurality of grits will be in effect in sequence one after the other as the tool is used. The abrasive tool allows for completion of a multi-grit concrete processing operation without need for manual tool change, which is an advantage since a more efficient concrete processing operation is obtained. The disclosed abrasive tools are particularly suitable for use with autonomously or semi-autonomously operated floor grinding equipment. The abrasive tools discussed herein may of course comprise three or more sections separated by two or more planes transversal to the wear direction, where the sections are arranged with decreasing grit size in the wear direction. Thus, it is appreciated that any number of different grit sizes can be integrated into a single abrasive tool. In fact, the grit sizes may even be arranged continuously with a grit gradient along the wear direction, i.e., a section may also be a part of the tool comprising a range of grits. For instance, an abrasive tool having a grit gradient starting out at a course grit, say 400 grit and continuously changing into a finer grit, say 1000 grit is construed as comprising at least two sections separated by a plane, where one section may be the grit range from 400-750 grit, and the other section may be the grit section with 750 grit to 1000 grit.

According to aspects, a tool attachment member is arranged in connection to the mounting surface. The tool attachment member is arranged to attach to a tool holder of the floor grinder. The tool attachment member allows for convenient attachment of the tool to a tool holder, which is an advantage. Also, as will be explained in the following, different types of multi-layer abrasive tools can be attached to the same tool holder in order to further customize the concrete surface processing operation.

According to aspects, a section located adjacent to the mounting surface comprises bonding material without abrasive particles. This means that the grinding effect of this last section is basically non-existent since the bonding material does not really provide any significant abrasive action. Thus, the last section with only bonding material acts as a distancing element to place the section with abrasive particles at a pre-determined distance from the mounting surface. As will be shown in the following, two or more abrasive tools having abrasive segments at different height can then be used to collectively process a concrete surface using different grit sizes without having to change the tool on the grinding machine.

According to aspects, the surface forms part of a boundary segment which extends in the wear direction. The boundary segment separates two sections from each other. This boundary segment can be used with advantage for various purposes. For instance, it may be configured with a color or texture different from a color or texture of the at least two sections to allow an operator to see when the grit is about to change, i.e., when one section has been worn down and another is about to come into contact with the concrete surface. The boundary segment may also comprise an identification circuit arranged to be read by a corresponding reader device, to allow an operator or a technician to determine, e.g., if the boundary segment is still intact or if it has been worn off partly or in its entirety. The boundary segment may furthermore comprise a sensor device arranged to detect when the boundary segment makes contact with the concrete surface, i.e., when the grit is about to change. An operator can be notified when this event occurs.

According to aspects, the at least two sections are formed in respective materials having different colors and/or textures. This way a visual indication is generated when the grit size changes due to the abrasive tool having been worn down by a given amount. The color may also be visible as a track behind the floor grinding machine, which allows an operator to visually determine which grit that currently contacts the concrete surface.

According to aspects, at least one of the at least two sections comprises a material which has been treated with a chemical composition to facilitate a concrete processing operation. This chemical composition will then be released as the abrasive tool is worn down, which provides for a more efficient grinding operation. Also, there is no need for a dedicated dispenser of this chemical compound. The chemical compound may, e.g., comprise a detergent, a primer, a polishing compound, or the like.

The object is also obtained by a tool holder for holding a plurality of abrasive tools as discussed above, where each abrasive tool comprises a protrusion extending transversally to the wear direction formed in connection to the mounting surface. The tool holder comprises a planar member with a plurality of through holes, where each through hole is arranged to receive a respective abrasive tool in the wear direction. This tool holder is arranged to receive a selection of abrasive tools, which selection can be determined with advantage in dependence of a given concrete surface processing task. This is an advantage since the tool holder can be used to customize the grinding operation via the selection of abrasive tools which are held by the tool holder. The assembly is not complicated, since it just amounts to inserting the selection of abrasive tools into the through holes, where they will be held in position by the respective protrusions extending transversally to the wear direction. The planar member may, e.g., be formed as a disc, and the through holes can be arranged in concentric circles centered on an axis of rotation of the tool holder. These features provide an efficient and stable grinding tool. According to aspects, the planar member is divided into symmetric sections by straight lines extending through the axis of rotation of the tool holder. This makes is easier for an operator to assemble the abrasive tools with the tool holder in a correct manner having a degree of symmetry, and with a more even distribution of the different types of tools over the tool holder.

There is also disclosed herein user equipment arranged to facilitate abrasive processing of a concrete surface. The user equipment comprises processing circuitry and a memory module. The processing circuitry is arranged to obtain input data indicative of at least an area of the concrete surface. A list of available abrasive tools is stored in the memory module together with information indicative of an abrading capability of each abrasive tool. The processing circuitry is arranged to determine a selection of abrasive tools from the list of available abrasive tools, such that the determined selection of abrasive tools is associated with a joint abrasive capability to process the concrete surface. Thus, the user equipment provides support for an operator in determining a suitable selection of abrasive tools for completing a given concrete processing task. For instance, the input data may be indicative of a desired end result by the abrasive processing of the concrete surface and the processing circuitry is arranged to determine the selection of abrasive tools from the list of available abrasive tools, such that the determined selection of abrasive tools is associated with a joint abrasive capability sufficient to obtain a desired end result.

According to aspects, the memory module comprises information indicative of a respective cost for at least some of the abrasive tools in the list of available abrasive tools and the processing circuitry is arranged to determine a cost associated with the selection of abrasive tools based on the information indicative of a respective cost. Thus, advantageously, the operator receives information about the expected cost associated with a given selection and can therefore perform a more efficient cost optimization during the planning of the concrete surface processing operation.

According to aspects, the memory module comprises information indicative of a respective processing time for at least some of the abrasive tools in the list of available abrasive tools and the processing circuitry is arranged to determine a work schedule associated with the selection of abrasive tools based on the information indicative of respective processing time. This feature simplifies planning of a concrete processing operation since it allows an operator to estimate the time a given concrete processing operation will take.

There is furthermore disclosed herein a method for abrasive processing of a concrete surface. The method comprises obtaining input data indicative of at least an area of the concrete surface, obtaining a list of available abrasive tools and information indicative of an abrading capability of each abrasive tool, determining a selection of abrasive tools from the list of available abrasive tools, such that the determined selection of abrasive tools is associated with a joint abrasive capability to process the concrete surface. The method provides an example usage of the herein disclosed multi-layered abrasive tools.

According to aspects, the input data is indicative of a desired end result by the abrasive processing of the concrete surface and the method further comprises determining the selection of abrasive tools from the list of available abrasive tools, such that the determined selection of abrasive tools is associated with a joint abrasive capability sufficient to obtain the desired end result.

According to aspects, the method further comprises obtaining information indicative of a respective cost for at least some of the abrasive tools in the list of available abrasive tools, and determining a cost associated with the selection of abrasive tools based on the information indicative of a respective cost. Thus, advantageously, an estimate of cost is obtained, and an operator may optimize the concrete processing operation in terms of cost, e.g., by comparing different options for obtaining a desired result.

According to aspects, the method further comprises obtaining information indicative of a respective processing time for at least some of the abrasive tools in the list of available abrasive tools and determining a work schedule associated with the selection of abrasive tools based on the information indicative of respective processing time. Thus, advantageously, an estimate of processing time is obtained, and an operator may optimize the concrete processing operation in terms of processing time.

The object is also obtained by a concrete surface processing machine for obtaining input data indicative of one or more properties of a concrete surface. The machine comprises means for self-locomotion and a control unit arranged to control the means for self-locomotion. The machine also comprises one or more surface property sensors connected to the control unit and arranged to determine a local surface quality of the concrete surface and the control unit is arranged to control a self-locomotion of the machine to determine a plurality of local surface quality values associated with respective different locations on the concrete surface. Thus, there is disclosed herein a machine able to traverse a concrete surface and determine the state or condition of the surface by using the surface property sensors before, during, and/or after a concrete surface processing operation, or part of a concrete processing operation. The data obtained from the one or more sensors may, e.g., be used to determine a suitable selection of abrasive tools as discussed above by inspecting a surface prior to performing the processing. For instance, if the surface is found to comprise many deep scratches or the like, a tool selection which performs more course grinding may be suitable. On the other hand, if the surface is found to be without defects, a less abrasive operation may be performed. The input from the concrete surface processing machine can also be used to form input to the type of planning data involving estimated tool cost and processing time discussed above. The machine may also be used to validate or verify that a given concrete processing operation has resulted in a desired result, or if further processing is required.

According to aspects, the concrete surface processing machine is arranged to rotate about an axis normal to the concrete surface by means for self-locomotion. The control unit is connected to at least one laser range finder arranged pointing in a fixed direction from the concrete surface processing machine, and the control unit is arranged to determine a boundary geometry and/or an area of the concrete surface based on a sequence of ranges obtained by the laser range finder. Since the entire concrete surface processing machine rotates, a fixed laser range finder mounted on the machine will also rotate. Thus, the fixed direction laser range finder will scan the environment around the machine just like a much more expensive and complex omni-scanning lidar device would. The arrangement provides a robust and low cost laser scanning capability which may support applications such as simultaneous localization and mapping (SLAM) and obstacle detection.

According to aspects, the control unit is connected to at least one linear photo sensor extending transversally to the concrete surface, and the control unit is arranged to detect a height of an incoming laser beam relative to the concrete surface, based on a point of incidence of the incoming laser beam on the linear photo sensor. The control unit is arranged to determine topology information associated with the concrete surface based on the detected height. This way a reliable accurate and low-cost means for measuring concrete surface height is provided. This height data can be used to form an accurate topology map of the concrete surface if the machine travels around on the concrete surface.

According to aspects, the local surface quality is indicative of the presence of scratch marks, cracks in the surface, and/or a level of surface gloss. This information can be used to better plan a future concrete surface processing operation and/or to verify that a desired result has been achieved by a concrete processing operation.

According to aspects, the one or more surface property sensors comprises a three-dimensional (3D) camera sensor. A 3D camera may be obtained with high resolution to detect also very small scratch marks and other defects in a concrete surface.

According to aspects, the one or more surface property sensors comprises a radar sensor and an inertial measurement unit (IMU) and the control unit is arranged to compensate an output signal from the radar sensor for vibration in the machine based on an output signal from the IMU. A radar sensor may not be very useful on its own if mounted on a concrete surface processing machine since the concrete surface processing machine often vibrates and moves around in an unpredictable manner. However, the IMU can be used to measure the vibrations, which data can then be used to compensate the radar signal for the vibration. This way a radar with performance sufficient to detect also very small defects in the concrete surface can be obtained at a reasonable cost.

According to aspects, the one or more surface property sensors comprises a laser scanner. Laser scanners are associated with high accuracy, which is an advantage.

According to aspects, the one or more surface property sensors comprises a gloss sensor. This way the concrete surface processing machine can also measure gloss over the surface, e.g., to verify that a polishing operation over the surface has resulted in a surface which meets specifications. If a section of the surface is found which does not have the required level of gloss (be it too high or too low gloss level), this section can be tagged for further processing at a later point in time.

According to aspects, the control unit is arranged to compare the plurality of local surface quality values to a pre-configured specification, and to output a surface quality report based on the comparison. This report may form at least part of the data input to a cost evaluation or processing time estimation. Also, this report may form part of a verification report indicating the outcome of one or more stages in a concrete surface processing operation.

According to aspects, the concrete surface processing machine comprising a moisture sensor and/or a temperature arranged to determine a moisture level and/or temperature, respectively, of the concrete surface. Having knowledge of the moisture and/or temperature allows an operator or an automated system to determine a maturity level of the concrete surface, which is helpful in order to plan different concrete processing operations which are associated with a maturity window, i.e., the operation is preferably performed while the concrete is not too soft and not too hard. Having knowledge of the moisture level also simplifies the determination of a suitable time to apply certain chemicals to the surface, which chemicals require a certain concrete surface moisture level in order to be effective.

According to aspects, the control unit is arranged to determine a maturity level of the concrete surface in dependence of the moisture level and/or the temperature of the concrete surface. The estimated maturity level forms valuable input to, e.g., planning of different stages in the concrete processing.

According to aspects, the concrete surface processing machine comprising a durometer and/or a device for forming a scratch mark in the concrete surface, and the control unit is arranged to determine a surface hardness level of the concrete surface based on an output from the durometer and/or based on a detected impact on the concrete surface by the durometer and or by the device for forming a scratch mark. It is an advantage to know the hardness level of a concrete surface since this simplifies planning of when to start different concrete surface processing operations.

According to aspects, the concrete surface processing machine comprises means for collecting dust from the concrete surface and means for weighting collected dust and slurry. The control unit can then be arranged to determine an efficiency of a concrete processing operation based on the amount of collected dust and slurry. This efficiency has multiple uses, which will be explained in the following. For instance, the current efficiency of the grinding operation can be reported to an operator, and an alarm signal may be triggered in case the amount of generated dust does not agree with an expected amount of generated dust.

According to aspects, the concrete surface processing machine also comprises means for dispensing a liquid and/or a chemical compound onto the concrete surface. This liquid and or chemical compound may improve the efficiency of the concrete surface processing operation, and this feature also voids the need for a separate dispenser of the chemical compound and/or the liquid.

There are also disclosed herein control units, methods, computer programs and floor grinding machines associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where FIGS. 1A-B illustrate an example floor grinder;

FIGS. 2A-B illustrate another example floor grinder;

FIG. 13 illustrates a concrete processing operation;

FIGS. 14-15 show example surface inspection robots;

FIG. 16 is a flow chart illustrating methods;

FIG. 17 schematically illustrates a control unit;

FIG. 18 schematically illustrates a computer program product;

FIGS. 19-20 show further examples of user equipment; and

DETAILED DESCRIPTION

Figure 3:
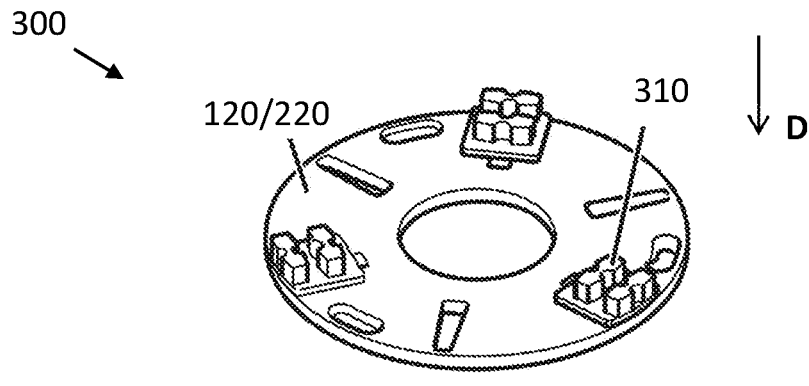
FIG. 3 shows abrasive grinding tools on a tool holder.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIGS. 1A and 1B illustrate an example floor grinder 100. The floor grinder 100 comprises a first electric motor 110 arranged to rotatably drive a number of tool holders 120 about respective axes A. Abrasive tools of varying grit and specifications can be mounted onto the tool holders 120. The tool holders 120 on the example machine 100 are comprised on a rotatable body section 130. This body section is often referred to as a planet. A second electric motor 115 is arranged to rotate the planet about a central axis B. The type of drive system shown in FIG. 1 is generally referred to as a planetary drive system.

Electrically powered floor grinders like that illustrated in FIG. 1 are generally known. Floor grinders driven by combustion engines, such as propane-fueled combustion engines, are also known. The techniques and devices disclosed herein are applicable with both electrically powered and combustion engine machines.

FIGS. 2A and 2B illustrate another type of floor grinder 200. This floor grinder is arranged for remote controlled or autonomous floor grinding operations. The machine 200 is supported on the concrete surface 101 by four rotatable grinding tools, where preferably the tools are paired such that the tools in a pair rotate in opposite directions $\omega 1$, $\omega 2$ and $\omega 3$, $\omega 4$. Each tool is held by a respective tool holder 220, and each tool holder is rotatably driven by a respective electric machine 210. There are four tool holders in the machine illustrated in FIGS. 2A and 2B, but three tool holders, or more than four tool holders are also possible. The electric motors 210, and a control unit 201 arranged to control the grinding operation, are enclosed in a body 230. A stop button 240 on the top of the machine 200 is accessible by an operator. This stop-button may also comprise means for generating a visible warning signal or a notification signal, such as a red light emitting diode (LED) for a warning signal and a yellow LED for a notification signal. The machine 200 may be equipped for floor grinding or floor polishing, depending on the abrasive tools mounted onto the tool holders 220.

This particular machine 200 differs from known floor grinding machines in that it is relatively small in both size and weight and does not comprise any manual control means such as a manual control handle or the like which an operator can use to steer the machine. Instead, this machine is self-propelled and comprises an on-board control unit 201, which control the various operations of the machine without an operator having to go near the machine. The machine 200 may be associated with a total weight less than 30 kg, and preferably no more than 25 kg. The machine footprint, i.e., the part of the surface covered by the grinder, may be comprised in a square of dimensions 100 cm by 100 cm, and preferably no more than 70 cm by 70 cm. Some example machines may even have a dimension on the order of 40 cm by 40 cm.

It is appreciated that the grinding tools and tool holders disclosed herein are also applicable together with hand-held equipment. Thus, the tools and techniques disclosed herein are not limited to any particular type of concrete processing machine.

FIG. 3 illustrates an example tool holder 120, 220 for use with the machines 100, 200. The tool holder is arranged to hold tool segments 310 for abrasive operation. The tool segments may, e.g., comprise diamond granules or other abrasive particles embedded into a tool segment matrix.

An abrasive tool for grinding or polishing is associated with a grit. The grit size indicates the abrasive grade of the tool. A higher grit number indicates a smaller abrasive grain and a finer abrasive product. The terms coarse, medium, and fine are often used in conjunction with grit size of abrasive grains.

An abrasive tool is associated with a wear direction D. The tool is worn down along the wear direction, as illustrated in FIG. 3. Thus, as the tools in FIG. 3 are used for concrete surface processing, the tools become smaller and smaller in the wear direction D.

Some of the techniques disclosed herein rely on this wear on abrasive segments as they are used to grind or polish a concrete surface. By forming a multi-layered abrasive tool comprising two or more sections divided transversally to the wear direction (preferably but not necessarily by a plane orthogonal to the wear direction), the first section will contact the concrete surface first, and then the second section when the first section has been worn off completely. This way different grits can be applied to the concrete surface without actually changing the tool attached to the tool holder 120, 220.

Examples of such abrasive tools are illustrated in FIGS. 4A, 4B, 65, 6, 7 and 8. This figures illustrate examples of an abrasive tool 310, 510, 700 for a floor grinder 100, 200. The tool extends along a wear direction D from a grinding surface G to a mounting surface M. The tool engages the concrete surface at the grinding surface G, and interfaces with the tool holder at the mounting surface M. Some of the tools are cuboid shaped, some are disc shaped, and some have more irregular shapes, such as the example abrasive tools shown in FIG. 3.

Figure 7:
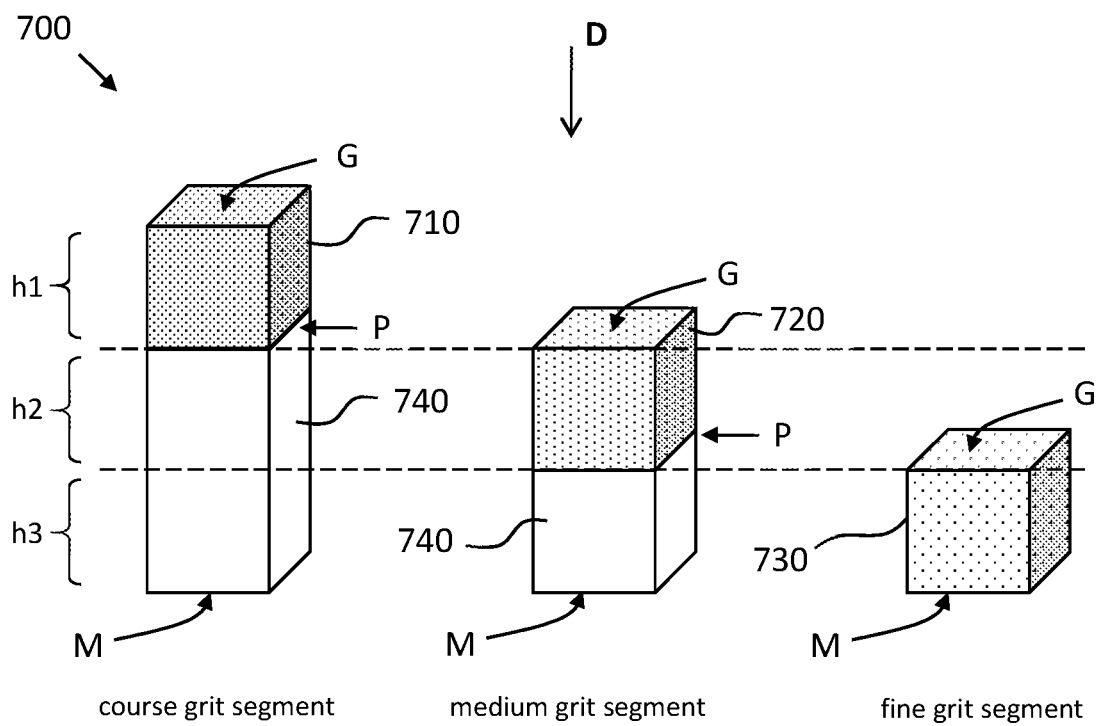
FIGS. 7-8 illustrate an example abrasive grinding tool concept.
Figure 8:
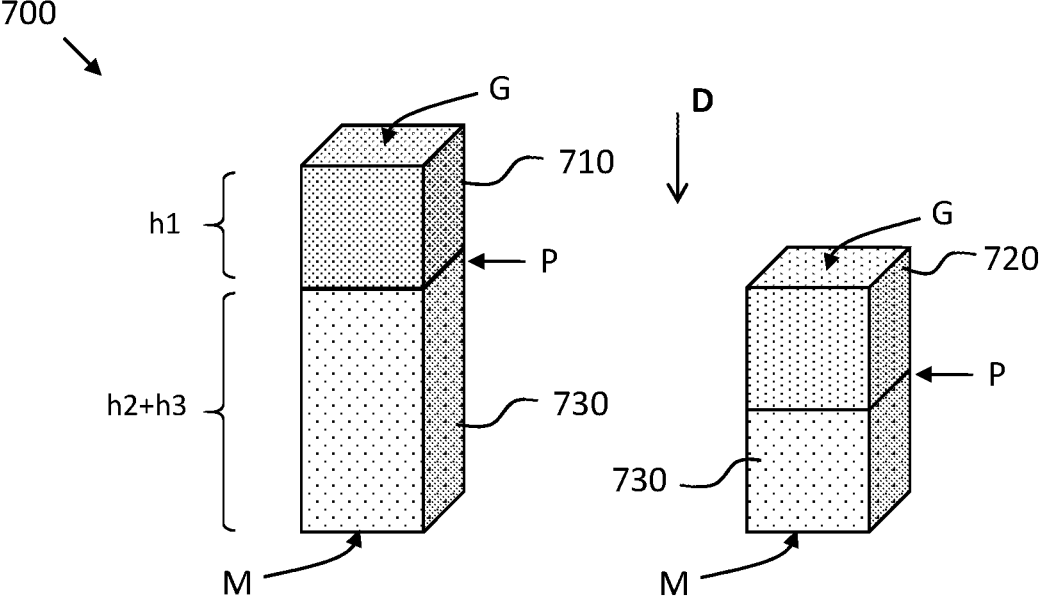

The abrasive tool comprises at least two sections 410, 420, 430, 610, 620, 630, 710, 720, 730, 740 separated by a surface P transversal to the wear direction D. As noted above, this surface is preferably a plane extending orthogonally to the wear direction D, but any (also non-planar) surface extending transversally to the wear direction will have the desired effect of a change in grit as the tool is abraded. The at least two sections comprise respective abrasive materials associated with different grit sizes, where the section located closer to the grinding surface G is associated with a larger grit size compared to the section located closer to the mounting surface M. Thus, first a course grit is applied to the surface, followed by a finer grit as the course grit is spent. The example in FIG. 7 and FIG. 8 shows an example of the disclosed technique where different segments are used for different grits, where the section located close to the mounting surface M has no abrasive particles or comprises a finest grit size. This example will be discussed in more detail below.

The surface P may be just a boundary between two sections, i.e., where one sections ends and another begins. However, additional advantages may be obtained if the surface P forms part of a boundary segment which extends in the wear direction, i.e., has a thickness. For instance such a boundary segment may comprise a material having a color or texture different from a color or texture of the at least two sections. This allows an operator to easily see if the boundary segment has been worn off or not by visual inspection. Also, this color may be configured so as to leave a visible sign on the concrete surface, which means that the concrete surface processing machine will leave a mark behind as the abrasive tool transitions between one section and another section. The boundary segment may also comprise an identification circuit arranged to be read by a corresponding reader device. This identification circuit may be configured to be read by a corresponding reader, allowing an operator to efficiently determine the status of a given abrasive tool. The identification circuit may comprise a radio frequency identification (RFID) circuit or some other form of circuit allowing interaction with a reader. The reader may be comprised in a concrete processing machine and/or in a handheld user equipment. The boundary segment may furthermore optionally comprise a sensor device, such as a conductive wire or circuit arranged to detect when the boundary segment makes contact with the concrete surface. For instance, a wire embedded in the abrasive tool will be cut when making contact with the concrete surface, which open circuit can then be detected by some form of detector.

The at least two sections can also be formed in respective materials having different colors and/or textures. This simplifies visual inspection by an operator. The sections may even comprise color which leaves a visible sign on the concrete surface, such that an operator can see which section of the abrasive tool that is currently in contact with the concrete surface.

At least one of the at least two sections may furthermore comprise a material which has been treated with a chemical composition to facilitate a concrete processing operation. This chemical composition may, e.g., be a washing compound of some sort, a coloring compound, a polishing compound, and/or a waxing compound.

It is appreciated that any number of different grit sizes can be integrated into a single abrasive tool. In fact, the grit sizes may even be arranged continuously as a grit gradient with progressively decreasing grit size along the wear direction. In other words, a "section" may also be interpreted as a part of the abrasive tool comprising a specific range of grits. For instance, an abrasive tool having a grit gradient starting out at a course grit, say 400 grit and continuously changing into a finer grit, say 1000 grit can also be construed as comprising at least two sections separated by a plane, where one section may be the section of the tool with grit range from 400-750 grit, and the other section may be the section of the tool with 750 grit to 1000 grit.

Figure 4A:
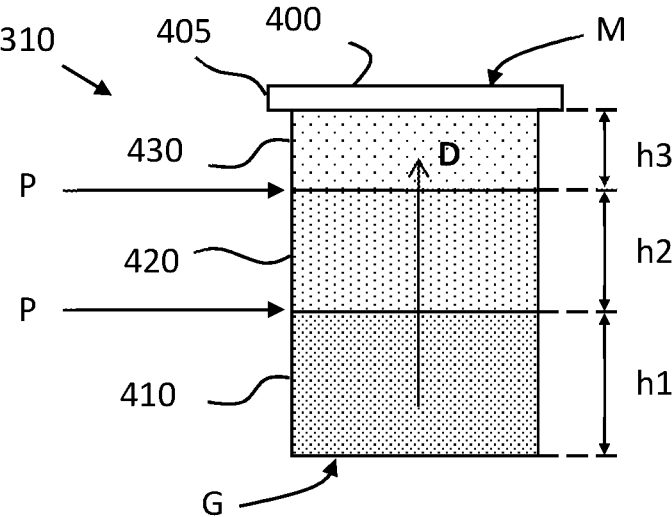
FIGS. 4A-B show example multi-layered abrasive grinding tools.
Figure 4B:
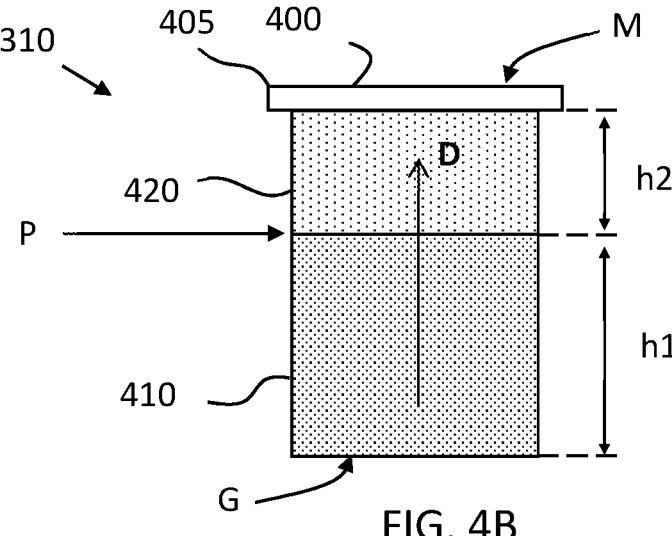

As shown in FIGS. 4A and 4B, a tool attachment member 400 is optionally arranged in connection to the mounting surface M. This tool attachment member is arranged to attach to a tool holder 120, 220 of the floor grinder 100, 200. Such tool attachment members are known and will therefore not be discussed in more detail herein.

The sections may be configured with different height h1, h2, h3. In other words, the height h1 of a first segment 410, 610, 710 measured in the wear direction D is different from a height h2 of a second grinding segment 420, 620, 740. This way the grinding duration of each stage can be controlled. It is appreciated that the different segments are likely to be associated with different wear rates (in terms of mm/s), for instance, a courser grit section is often worn away faster compared to a finer grit section. Also, the wear rate can be a function of the bonding material used in each section. By adjusting the height of the different sections, the time spent grinding or polishing using a given grit size can be controlled. The higher the section height, the more time will be spent using that particular section compared to if a smaller height had been configured for the same section.

The abrasive tool may of course comprise three or more sections 410, 420, 430, 610, 620, 630 separated by two or more surfaces or planes P transversal to the wear direction D, where the sections are arranged with decreasing grit size in the wear direction D, i.e., as the tool is worn down, the more and more fine grit is applied to the concrete surface.

Figure 5:
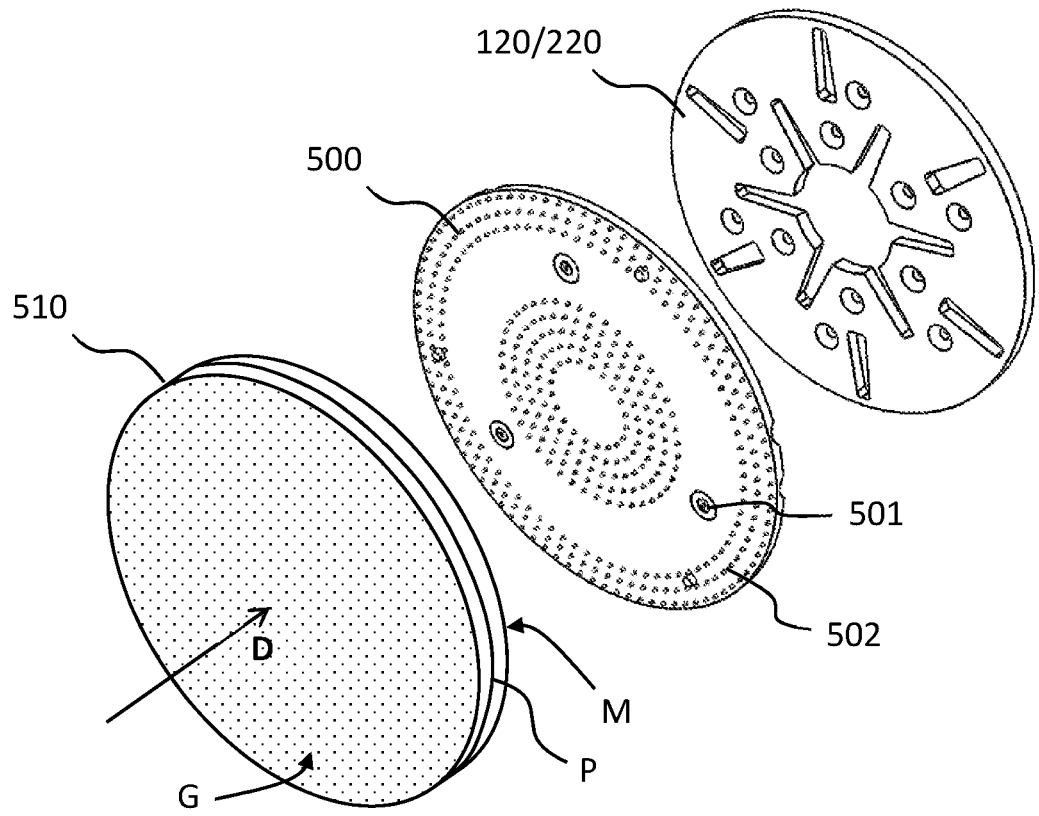
FIG. 5 shows an abrasive grinding tool on a tool holder.
Figure 6:
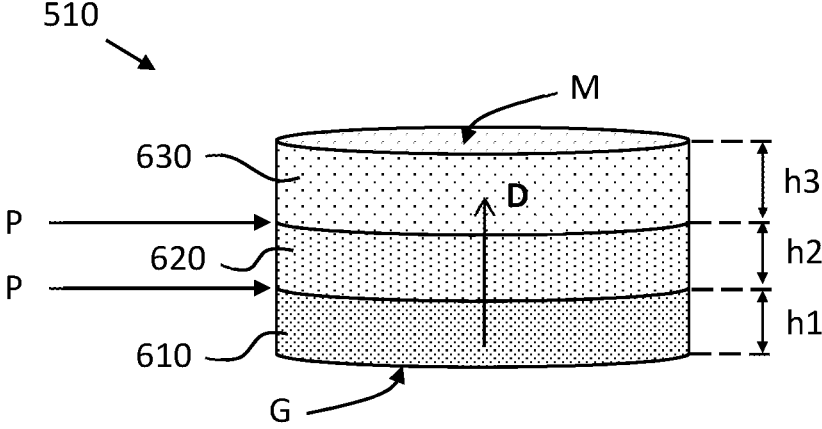
FIG. 6 shows an example multi-layered abrasive grinding tool.

FIG. 5 illustrates a slightly different formfactor type of abrasive tool 510 compared to the tools 310 shown in FIG. 3. This type of disc-shaped tool is more commonly seen in polishing applications. The tool 510 attaches to an intermediary tool holder 500 by a combination of pins 502 and magnets 501. This intermediary tool holder 500 then attaches to a regular tool holder 120, 220. The disc shaped tool 510 again has a grinding surface G and a mounting surface M. The abrasive tool is divided into sections 610, 620, 630 separated by surfaces P, as shown in FIG. 6. Of course, two or more sections are possible. Again, with reference to FIG. 6, as the tool 510 is worn down, the different sections will be exposed to the concrete surface in sequence, thus providing an effective change of grit size as the concrete surface processing operation proceeds.

FIG. 7 and FIG. 8 illustrate another application of the general teaching. In this example a combination of multi-layered abrasive tool elements is used in combination to achieve the intended result of a changing grit as the concrete processing operation proceeds. Each tool is associated with a total height, and only the section closest to the grinding surface (when the tool is unused) comprises abrasive particles of the desired grit. The height at which one section terminates corresponds to the total height of another abrasive tool element. Thus, the grinding operation starts at the tallest tool element which is first worn down. When the abrasive section on this tool element is worn down entirely, another abrasive tool element picks up, and continues the grinding process at a finer grit. The previous tool element now only has bonding material or the finest grit size which does not contribute to the grinding. Thus, according to aspects, a section 740 located adjacent to the mounting surface M optionally comprises bonding material without abrasive particles.

FIG. 8 shows an example where the topmost section 710 closest to the grinding surface G (when the tool is new) comprises a courser grit and the bottommost section closest to the mounting surface M comprises a fine grit 730. This fine grit may, e.g., correspond to the finest grit in the sequence illustrated above in FIG. 7.

With reference to the example 700 in FIG. 7, the leftmost abrasive tool element first contacts the concrete surface. This tool element is associated with a course grit top section 710, which is used for the first processing stage. Once this tool is worn down by a height h1, the abrasive particle content ceases and a pure bonding material section 740 commences. When this happens, a medium grit section 720 of another tool segment starts to contact the concrete surface. This tool section is then worn down until a fine grit segment 730 of a third type of tool element starts to contact the concrete surface. Thus, as the different tool elements are work down in sequence, the concrete surface is processed by three different types of grit.

With reference to FIGS. 4A, 4B and FIG. 9, a protrusion 405 may be formed extending transversally to the wear direction D in connection to the mounting surface M. This protrusion facilitates assembling the abrasive tool with a tool holder.

Figure 9A:
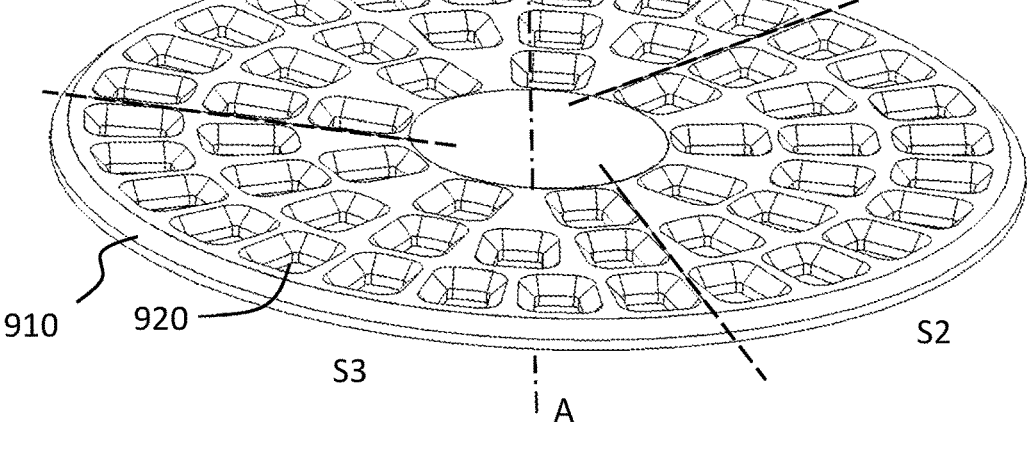
FIGS. 9A-B show an example tool holder for holding a plurality of tools.
Figure 9B:
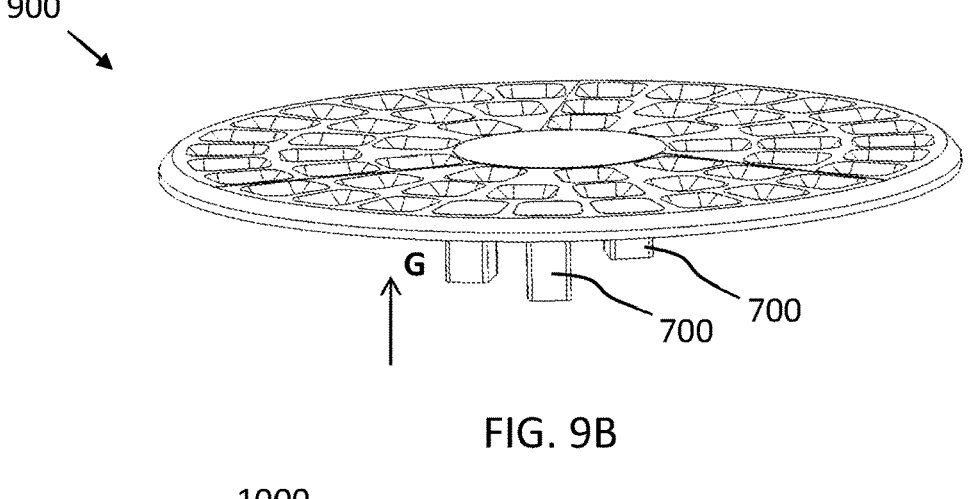

FIGS. 9A and 9B illustrate an example tool holder 900 for holding a plurality of abrasive tools 310, 700, wherein each abrasive tool extends along a wear direction D from a grinding surface G to a mounting surface M and wherein each abrasive tool comprises a protrusion 405 extending transversally to the wear direction D formed in connection to the mounting surface M. This tool holder comprises a planar member 910 with a plurality of through holes 920, where each through hole is arranged to receive a respective abrasive tool 310, 700 substantially along the wear direction D. Thus, a user may simply insert a collection of tools into the through-holes, which tools will then be held in position by the protrusions 405. A holding plate or the like can then be used to fix the abrasive tools in the through-holes. The planar member 910 can also be directly attached to a tool holder 120, 220 as discussed above, and held in position by, e.g., a bolt, quick-lock device, or the like.

The planar member 910 illustrated in FIGS. 9A and 9B is a disc. However, other shapes of the planar member are also possible, such as squares, polygons, and the like.

The through holes 920 are preferably arranged in concentric circles centered on an axis of rotation A of the tool holder as illustrated in FIG. 9A. The planar member 910 may also be divided into three or more symmetric sections S1, S2, S3 by straight lines extending through the axis of rotation A of the tool holder. These sections allow an operator to distribute different types of tools more evenly. To simplify assembly further, the different sections can be color-coded.

Each through hole 920 optionally has a chamfered opening on one side for receiving a respective abrasive tool 310, 700 comprising a protrusion 405 extending transversally to the wear direction D and formed in connection to the mounting surface M of the abrasive tool. This chamfering of the protrusion 405 and the opening of the through-hole improves stability of the overall assembly.

An operator wishing to process a concrete surface to obtain s desired result may select tools from an assortment of tools, such as tools like those discussed in connection to FIG. 7. If the operator wishes to grind the surface heavily, then tool segments having large parts with course grit are selected by the operator. If the operator, on the other hand, simply wishes to remove a thin surface layer of the concrete surface, and then perform a smoothing and perhaps also a polishing operation, then less course grit is selected in favor of more finer grits.

This selection of different types of abrasive tools, i.e., tools having different sections with different heights and with different grits, is mainly selected based on the size of the concrete surface to be processed and on the desired end result. Optionally, the surface quality of the concrete surface 101 also impacts the selection of tools for processing the concrete surface. For instance, a surface with scratch marks and other defects may require more course grinding compared to a surface with less defects.

Figures 11, 12:
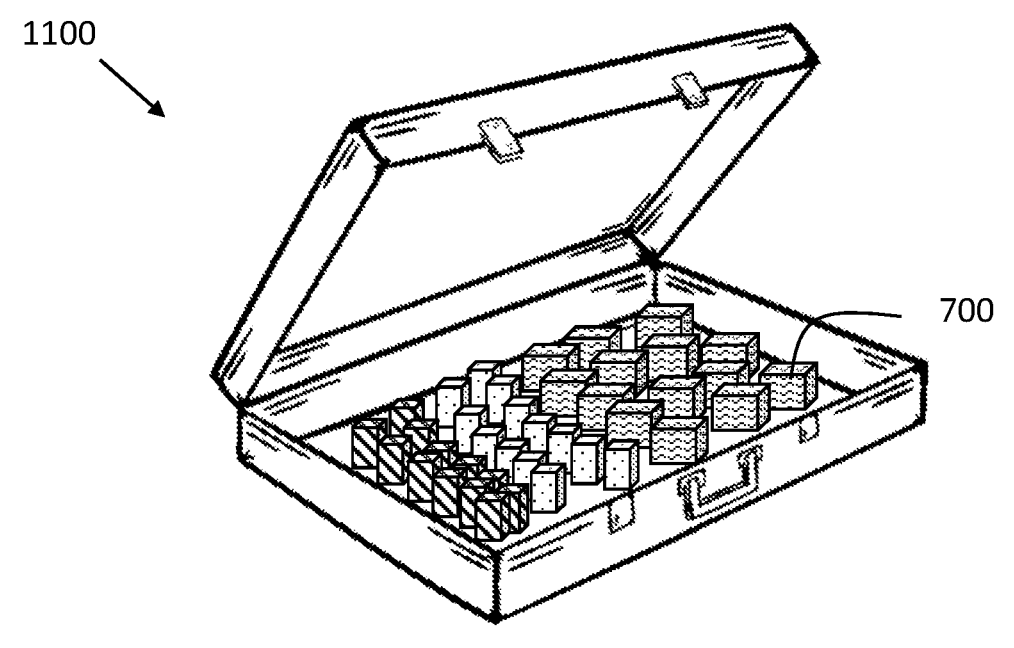
FIG. 11 illustrates a kit of abrasive tools.
FIG. 12 illustrates an example user equipment.

FIG. 11 schematically illustrates an assortment 1100 of tools 700 having, e.g., different heights overall and different grit sections, where an operator can make a selection in order to obtain a desired result given, e.g., the size of the concrete surface to be processed, and the desired end result. Of course, the tools comprised in the assortment may also be of the type shown in FIGS. 4A and 4B, and/or the type of tool illustrated in FIG. 5.

Figure 10:
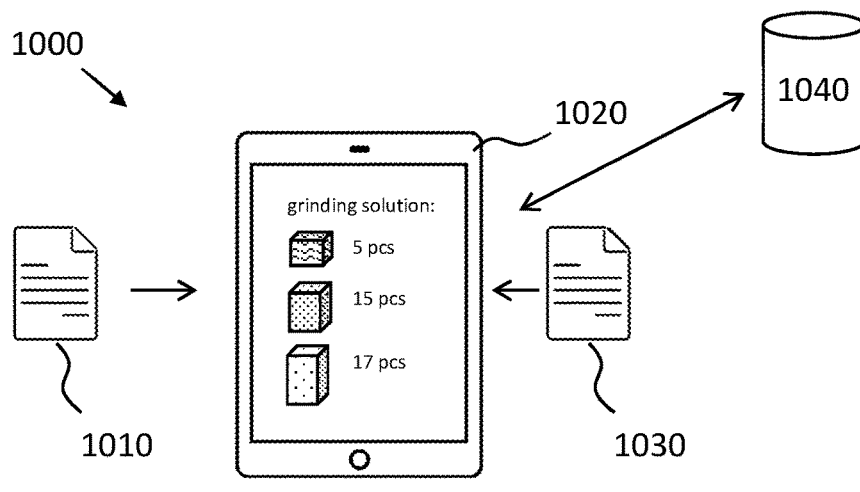
FIG. 10 illustrates an example user equipment.
Figure 21:
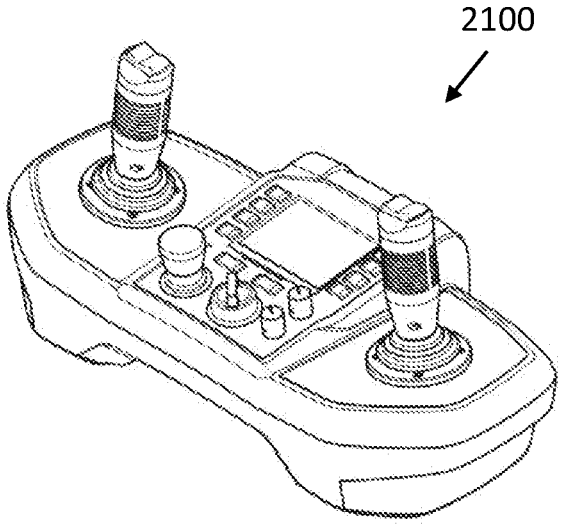
FIG. 21 illustrates a remote control device.

A computer implemented support tool may assist a contractor in making the selection of tools to perform a given concrete surface processing operation. FIG. 10 and FIG. 12 illustrate examples of such supporting computer implemented systems, which will be referred to herein as user equipment. It is appreciated that such user equipment can be implemented in a tablet or other wireless device, or as a web-based system, or in a proprietary electronic device. The user equipment may also be integrated with a remote control device 2100 as illustrated in FIG. 21.

Thus, with reference to Figure which 17 illustrates some functional features of a general control unit 1700, there is also disclosed herein user equipment 1020, 1200 arranged to facilitate abrasive processing of a concrete surface 101. The user equipment 1020, 1200 comprises processing circuitry 1710 and a memory module 1730. The processing circuitry 1710 is arranged to obtain input data 1010 indicative of at least an area of the concrete surface 101. A list 1030 of available abrasive tools 310, 510, 700 is stored in the memory module 1730 together with information indicative of an abrading capability of each abrasive tool. Alternatively, the list 1030 is obtained on demand from a remote device 1040, such as a remote server. The processing circuitry 1710 is arranged to determine a selection of abrasive tools from the list of available abrasive tools, such that the determined selection of abrasive tools is associated with a joint abrasive capability to process the concrete surface 101.

The selection can, for instance, be based on a number of pre-configured options, where the pre-configured option most closely resembling the input data 1010 is chosen as the determined selection. The selection can also be based on the solution to an integer programming problem or based on some other form of mathematical optimization routine. The selection can furthermore be based on simulation involving the input data and the available tools. Of course, combinations of these methods can also be used. For instance, a mathematical iterative optimization routine can be initialized based on a look-up table, which optimization routine may the converge towards a suitable selection for processing a given concrete surface to obtain a desired result.

Thus, as illustrated in FIG. 10, a user of the concrete processing systems disclosed herein may input data 1010 describing one or more properties of the concrete surface into the support tool 1020, which may be implemented on a tablet, or some other form of personal device. The device 1020 may as mentioned above be equipped with wireless communication capability in order to access data on a remote server 1040, e.g., via interface 1720. This remote server may, e.g., store different available tool assortments, tool capabilities, and the like. A list of available abrasive tools 1030 is also input into the support system, which then generates a proposed selection of tools which together will provide the desired result for the concrete surface associated with the input data 1010. In the example of FIG. 10, this particular solution involves the use of 17 course grit segments, 15 medium grit segments, and 5 fine grit segments for final polishing. These segments are then to be assembled on a tool holder, such as the tool holder 900 discussed above in connection to FIG. 9, before the concrete processing operation commences. Advantageously, there is no need for a tool change during the operation, which means that the machine can be left to process a concrete surface during nighttime.

According to aspects, the input data 1010 is indicative of a desired end result by the abrasive processing of the concrete surface 101. The processing circuitry 1710 is then arranged to determine the selection of abrasive tools from the list of available abrasive tools, such that the determined selection of abrasive tools is associated with a joint abrasive capability sufficient to obtain the desired end result. This desired end result may, e.g., be a certain surface texture, a desired topology in terms of a required flatness, or the like. The desired end result may also comprise a fixed amount of material to be removed from the concrete surface, such as a removal of 1-2 mm over the entire surface.

The memory module 1730 or, equivalently, the remote server 1040, may also comprise information indicative of a respective cost for at least some of the abrasive tools in the list 1030 of available abrasive tools 310, 510, 700. The processing circuitry 1710 can then be arranged to determine a cost associated with the selection of abrasive tools based on the information indicative of a respective cost. This cost may be measured in terms of different units, such as monetary cost (in, e.g., euro or dollars), energy spent, time to wear down the tool, etc. The example user equipment in FIG. 12 shows a user interface which displays the proposed selection of tools together with an associated monetary cost of the proposed selection of tools.

The memory module 1730, or, equivalently, the remote server 1040, may furthermore comprise information indicative of a respective processing time 1210 for at least some of the abrasive tools in the list 1030 of available abrasive tools 310, 510, 700. The processing circuitry 1710 can then be arranged to determine a work schedule associated with the selection of abrasive tools based on the information indicative of respective processing time. An example user interface displaying a work schedule for the proposed selection of tools is shown on the display of the user equipment 1200 in FIG. 12. This work schedule takes T minutes or hours to complete. The user equipment is optionally also arranged to indicate a current status 1220 of the concrete processing operation. Thus, by means of the user equipment disclosed herein, a contractor, project planner, or site manager may not only determine the expected cost of the tools for a given job, but also how long the job is expected to take. This simplifies overall work planning at a construction site, which is an advantage.

FIGS. 14 and 15 illustrate examples of surface inspection robots which can be used with advantage to provide the input data 1010 to the control units of the user equipment 1000, 1200 discussed above in connection to FIGS. 10 and 12, and also for other purposes such as surveying a concrete surface in preparation for a processing operation and verifying an end result of a concrete processing operation.

FIGS. 19 and 20 illustrate example user equipment 1900, 2000 arranged for surface inspection prior to a concrete processing operation, and result validation after concrete processing has been performed.

FIG. 19 illustrates user equipment 1900 which is communicatively coupled to a surface inspection robot 1400, 1500, e.g., via wireless link 1910. The user equipment comprises display means 1920 which shows the result of a surface inspection to a user, such as, for instance, if a surface area has been successfully determined, if there are any significant surface defects which may impact the end result, and if topology information has been obtained. The display means 1920 may also show a map of the concrete surface, which indicates any defects and other objects of importance. Perhaps some detected obstacle can be removed by the operator prior to starting the concrete processing operation. Input data 1930 is optionally obtained to assist in the surface inspection. Thus input data may, e.g., comprise blueprints over the work-site, i.e., a map. Information about the type of concrete used, location of known defects, and the like.

The input data 1930 may also comprise a requirement specification which is formatted for input to the user equipment, and the result of the surface inspection can then be checked against the requirement specification 1930 in order to make sure that the surface can be processed as intended, perhaps at or below a cost limit or time limit. FIG. 20 illustrates an example user equipment 2000. This user equipment is configured to performs validation of a processed concrete surface. Perhaps there is a requirement on texture or topology which must be met in order for the surface to pass the validation, a requirement on gloss, or a limit on the amount of scratch marks or cracks in the surface. If the surface does not meet requirements according to the input data 1930, then the user equipment will indicate a failed validation, and the operator can take further action, perhaps by starting additional processing of the concrete surface. The location of detected defects can be indicated on the display, perhaps associated with respective location on the surface, as shown in FIG. 20.

Figure 13:
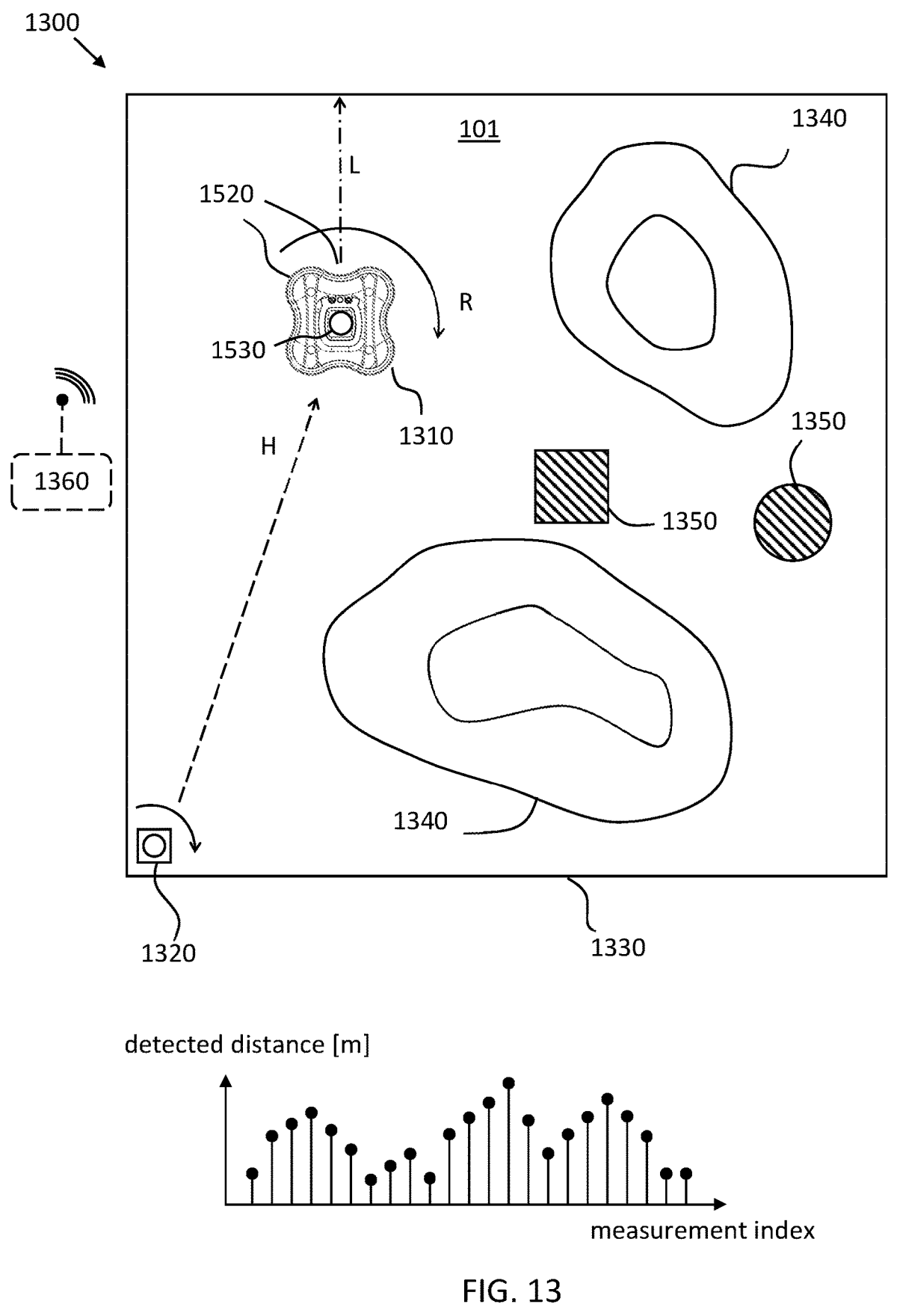

FIG. 13 shows an example surface inspection robot 1310 configured for performing a surface inspection of a concrete surface 101. This example surface inspection robot is based on the self-propelled machine 200 discussed above in connection to FIGS. 2A and 2B.

The surface inspection robots discussed herein comprise various features and abilities. Among these features is an optional ability to determine a height of the concrete surface on which the machine is currently supported, by a relatively low cost linear photo sensor. This allows the machine, or an external control unit connected to the machine, to generate a topology map over the concrete surface. This topology map indicates, e.g., sections of the concrete surface which are higher or lower than the average surface height.

Another interesting optional ability is a simultaneous localization and mapping function. A key component of this feature is a laser range finder arranged pointing in a fixed direction from the machine. By rotating the entire machine about an axle normal to the concrete surface, an omnidirectional image of the surroundings is generated. The data obtained from this relatively low cost sensor is similar to that obtained from a 360 degree lidar scanner, although this is a much more expensive sensor.

A third optional feature of the surface inspection robots disclosed herein is a concrete surface inspection feature. This feature allows a machine to inspect the concrete surface and to determine one or more quality parameters of the surface, such as if the surface comprises scratch marks or cracks. This feature can be used with advantage to assess whether a given concrete processing operation stage has been successfully completed such that a next stage can commence, or if additional processing is required. Thus, leaving coarse scratches which cannot be removed by a following grinding stage is avoided.

A fourth optional feature of the concrete surface processing machines discussed herein is a dust collecting ability. By arranging suction devices and dust containers on the machine, an ability to collect dust from the concrete surface is obtained. A means for weighting collected dust and slurry can also be added to the machine, this feature allows a control unit to determine an efficiency of the concrete processing, i.e., how much concrete that is grinded off the surface in a given interval of time.

It is appreciated that all of these optional abilities and features may be freely combined in the concrete surface processing machine. Thus, although some features are discussed in combination, this does not mean that they cannot be used separately, as will be readily understood by the skilled person.

One option for generating locomotion by the machine 200 relative to the concrete surface is if at least one tool carrier axis is arranged tiltable in one or two dimensions with respect to a base plane of the machine. Such tilting can be used to generate locomotion by the machine in a forward direction F, as well as a controlled rotation by the machine relative to the concrete surface about a machine centroid.

The magnitude of the force generated in the forward direction also depends on the rotational velocity of the grinding disc. The relationship between these factors and the generated force is given by a function $$F_i = f(T_i, \omega_i, w_i)$$

where $T_i$ is a two-dimensional tilt vector representing direction and magnitude of the tilt of the i-th tool head, $\omega_i$ is the rotational velocity of the i-th tool head, and $w_i$ is the weight placed on the i-th tool head which is indicative of the normal force of the tool head. This function is normally an approximation of the true relationship between parameters and the resulting force. This approximation can be arrived at by, e.g., a combination of analytical derivation and laboratory experimentation. A calibration routine can be carried out in order to adjust the function to match a given device and operating condition. Generally, rotation about the mass center of the robot 200 is generated by the torque $M_z$ $$M_z = \sum_{i=1}^{N} r_i \times F_i$$

where $r_i$ is the distance and direction to the mass centre, and where N=4 in FIGS. 2A and 2B. A turning motion by the machine can be achieved by varying the forces $F_i$ such that a non-zero torque $M_z$ is generated. Thus, turning of the machine, or motion along an arcuate path, can be achieved by varying the set of tilt angles $\{arg(T_i)\}_{i=1,\ldots,4}$ or the set of tilt magnitudes $\{|T_i|\}_{i=1,\ldots,4}$ in a controlled manner, and/or by varying rotational velocity $\{\omega_i\}_{i=1,\ldots,4}$ and/or by varying normal load $\{w_i\}_{i=1,\ldots,4}$. It is appreciated that rotational velocity and weight are entirely optional control parameters. Only control of the tilt $\{T_i\}_{i=1,\ldots,4}$ is required to obtain basic functionality.

The total force $F_{tot}$ (disregarding friction forces and the like) is given by $$F_{tot} = \sum_{i=1}^{N} F_i$$

This quantity determines the direction of motion as well as the speed of the machine. The control unit 1410, 1510, can be configured to generate a desired total force to move the machine in a desired direction, and/or a desired torque to rotate the floor grinder by generating one or more control signals to the different actuators on the machine 100. A combination of a non-zero total force and a non-zero torque about the mass center will generate a motion by the machine along an arcuate path. $F_{tot}$ is preferably optimized for a given floor surfacing operation by the control unit.

The surface inspection robots discussed herein may be powered by one or more rechargeable batteries configured to power one or more electric machines on the machine. These batteries may advantageously be charged using an inductive charging circuit arranged to interface with an external power source and to recharge the one or more rechargeable batteries. For instance, a coil may be embedded directly into the concrete surface which is to be processed by the machine.

The surface inspection robots exemplified in FIGS. 14 and 15 comprise a control unit 1410, 1510 connected to at least one linear photo sensor 1430, 1530 or linear image sensor extending transversally to the concrete surface 101. This linear photo sensor is arranged to register an incoming laser beam, such as an incoming laser beam from the rotary laser 1320 in FIG. 13. Rotary lasers are devices arranged to generate a laser beam parallel to some reference surface. Rotary lasers which generate horizontally aligned laser beams are often referred to as laser levels.

Basically, a linear photo sensor is a vertical array of photo sensors. A laser beam hitting a photo sensor in the array will trigger generation of a signal from that photo sensor. A control unit connected to the linear photo sensor can therefore detect the height at which a laser beam strikes the linear photo sensor. A linear photo sensor may also comprise photo sensors arranged in matrix configuration, i.e., in two or more adjacent arrays of photo sensing elements. Such as array may not only detect the height at which an incoming laser beam strikes the array but may potentially also detect a tilt of the machine relative to, e.g., the horizontal plane.

With reference again to FIG. 14 and FIG. 15, the control unit 1410, 1510 is arranged to detect a height h of an incoming laser beam H relative to the concrete surface 101, based on a point of incidence of the incoming laser beam H on the linear photo sensor. Rotary lasers are commonly used to establish a horizontal frame of reference at, e.g., construction sites and the like. The rotary laser is deployed at a surface and aligned to transmit a rotating laser beam parallel to the surface. The combination of the linear photo sensor 1430, 1530 and the control unit 1410, 1510 arranged to detect the height h enables the machine to determine a surface topology of the concrete surface. By moving around on the concrete surface and measuring the height h, a topology map can be created. This topology map can then be used to plan or control concrete surface processing in order to arrive at a desired result, such as a flat concrete surface, or a concrete surface which has been grinded down by an equal amount over the surface.

If the topology map forms part of the input data 1010, then the user equipment 1000, 1200 can estimate the required amount of grinding tools to, e.g., achieve a flat surface.

FIG. 13 shows an example application 1300 of a surface inspection robot 1310 which is inspecting a concrete surface 101. The surface is delimited by a boundary 1330, this boundary can be a wall or some other type of structure, or it can be an imaginary boundary marked by boundary markers, such as laser reflectors (mirrors), radar reflectors, visual markers, or other types of markers. Thus, an operator can define the area to be mapped and processed, or a natural boundary like the walls of a room can be used to delimit the area.

A rotary laser 1320 is deployed on the concrete surface. This rotary laser generates a laser beam H which impinges on the surface inspection robot. Thus, the machine 1310 may determine a height of the concrete surface section where the machine is located by means of the linear photo sensor or sensors discussed above.

The height of the concrete surface 101 varies as illustrated by the equidistance lines 1340, i.e., the surface is not perfectly flat. Some obstacles 1350 are also present on the surface. The machines disclosed herein can be used to generate a topology map of the surface, including detecting the boundary geometry 1330 (and thus also determine the area of the concrete surface) as well as the differences in height 1340 over the surface. This topology map can then be used by an operator to plan a concrete processing operation, and/or to evaluate the result of an already performed concrete processing operation. The topology map and inspection data can also be used with advantage as the input data 1010 to the user equipment discussed above. As will be discussed in more detail below, the concrete surface processing machine disclosed herein can also be used to evaluate a quality of the concrete surface, such as if the concrete surface comprises scratch marks, cracks, pores, or if the gloss is not according to specification.

According to aspects, the control unit is arranged to average the detected height h over time to determine an average detected height. The control unit may also receive height data from other machines located on the same concrete surface. For instance, a swarm of concrete surface processing machines may be used to process the concrete surface. These machines may then collaborate to generate a topology map of the concrete surface with higher accuracy due to the averaging. This averaging of course requires that the height data be timestamped and tagged with location. The time stamp can be used to weight the height data, where older data items are given less weight, since it becomes more likely that the section of surface has been processed by other machines since the height measurement was made.

One or more linear photo sensors 1430, 1530 may be arranged on a part of the machine extending upwards from the concrete surface, as shown in FIG. 15. Alternatively, or as a complement, one or more of the linear photo sensors may also be arranged integrated with the cover, as also illustrated in FIG. 15. The surface inspection robot illustrated in FIG. 15 comprises two linear photo sensors arranged separated along a line parallel to a base plane of the robot. The control unit 1510 can then be arranged to determine a tilt of the machine with respect to the concrete surface based on a difference in the detected height h of the incoming laser beam H at the two linear photo sensors.

The data from these two or more linear photo sensors arranged separated along the line parallel to the base plane can be used as direct input to the control unit, or indirectly as calibration data for calibrating another sensor, such as an IMU or the like.

The surface inspection robot may also be arranged to rotate about an axis normal to the concrete surface by the one or more abrasive tools. The axis may be a central axis of the machine, or some other axis. An eccentric rotation pattern is of course also possible. If the control unit 1410, 1510 is connected to at least one laser range finder 1420, 1520 arranged pointing in a fixed direction from the concrete surface processing machine, a function similar to that of a 360 degree lidar device is obtained, albeit at a much lower cost. As the machine rotates about the axis, the laser range finder scans the surrounding environment and determines the range to the nearest object in all directions, shown by the graph in FIG. 13 where an example of detected distance is shown vs a measurement index. Thus, an "image" or representation of the surrounding environment is obtained. The control unit can then be arranged to determine a boundary geometry 1330 of the concrete surface based on a sequence of ranges obtained by the laser range finder 1420, 1520, as also a surface area based on the boundary geometry. It is appreciated that each complete revolution by the machine generates a sequence of ranges, which sequence of ranges will repeat itself if the machine remains at a given location or will shift slightly between full rotations if the machine moves in some direction. The control unit may perform simultaneous localization and mapping (SLAM) based on the sequence of rangers obtained from the laser range finder.

The surface inspection robot may also comprise a downward looking sensor 1440, 1540 such as a downward looking radar transceiver or laser rangefinder, arranged to detect a distance to the concrete surface 101 along a normal vector to the concrete surface. This downward looking rangefinder essentially measures the height of the support elements mounted on the machine. If the machine is used for grinding, then the detected range by the downward looking rangefinder will decrease over time as the grinding tools get worn down. The control unit 1410, 1510 may therefore adjust the detected height h of the concrete surface based on the detected distance to the concrete surface 101. Thus, tool type and tool wear will have little or no effect on the detected height h, which means that a topology map over the concrete surface 101 will be generated independently of tool wear and thus with higher accuracy compared to the case where tool wear is not accounted for. It is also appreciated that this sensor can be used to adjust the determined height for different types of tools. There is no longer a need to configure an exact tool height a-priori since the control unit can use the data from the downward looking sensor to compensate for variation in tool height. Also, the current grit contacting the concrete surface in a multi-layered abrasive tool can be determined. This information can be sent to a user equipment like that in FIG. 10 or FIG. 12, which user equipment can then indicate the progress of the concrete processing operation. This is illustrated by the dash-dotted line 1220 on the display of the device in FIG. 12.

According to an example use-case, the surface inspection robot may first be calibrated without tools attached by placing it on the concrete surface 101. The downward looking sensor then determines the distance to the surface without tools attached. The height of the tool, after it has been attached, can then be determined based on a difference in height detected by the sensor.

The surface inspection robot 1310, 1400, 1500 may furthermore comprise a plurality of laser range finders arranged pointing in different respective directions, or just a single laser range finder. The advantage of having more than one laser range finder is, of course, that more distance measurements can be made, which allows a greater degree of averaging and therefore also an increased accuracy in the range estimates.

Any of the machines disclosed herein may comprise more than one range finder, and in particular two or more different types of laser range finders. For instance, a first laser range finder in the plurality of laser range finders may be configured for detecting range at a higher resolution compared to a second laser range finder in the plurality of laser range finders. The first laser range finder in the plurality of laser range finders may perhaps be configured for detecting range at a shorter distance compared to a second laser range finder in the plurality of laser range finders, but in return provide range data with higher resolution. This way high resolution close range distance data can be obtained from some of the laser range finders, while other range finders provide a lower resolution but increased range.

Optionally, one laser range finder in the plurality of laser range finders is configured in a different directional attitude compared to another laser range finder in the plurality of laser range finders. This way a better view of the surrounding environment can be obtained in the altitude dimension, i.e., in the dimension normal to the concrete surface. Some obstacles may, for instance, be protruding from a wall, where they cannot be seen by a laser range finder directed parallel to the concrete surface and close to the surface. However, a laser range finder directed with an attitude, i.e., pointing with an angle upwards from the concrete surface may be able to detect the obstacle. It is appreciated that obstacles located distanced from the concrete surface by a distance larger than a total height of the surface inspection robot will not present an obstacle to the machine. However, such obstacles may still be of interest if a map of the area is generated.

Optionally, at least one laser range finder 1420, 1520 is arranged to scan in an elevation direction. This means that the laser range finder has an attitude which changes over time, preferably rapidly, to generate distance data over a range of attitude angles.

According to some aspects, with reference to FIGS. 14 and 15, the control unit 1410, 1510 is arranged to obtain a position of the machine on the surface 101, and to associate the height h to the position on the surface. This data essentially constitutes a topology map of the surface. The topology map data can either be used internally by the machine, and it can also be communicated to a remote device 1360, such as one of the user equipment 1000, 1200.

There are several ways in which the surface inspection robot can establish a map of the concrete surface, comprising information about the boundary 1330 and optionally also of any obstacles 1350 present in the area.

According to some aspects, the control unit on the surface inspection robot 1310 comprises means for positioning the machine on the surface, such as a GPS or some form of indoor positioning system, e.g., based on radio beacons, infrared beacons, or lasers. In other words, the surface inspection robot is optionally arranged to obtain a position of the robot on the surface, and to associate each determined range to a respective position of the machine on the surface. The machine may further comprise any of an electronic compass, a gyroscope and/or an inertial measurement unit, IMU, arranged to determine an angle of rotation of the concrete surface processing machine, wherein the surface inspection robot is arranged to associate each determined range by the laser range finder to a respective angle of rotation of the concrete surface processing machine. Thus, the control unit is able to associate each range measurement by the laser range finder to an angle originating from a location on the surface, which means that the surface inspection robot can easily establish a map over the surface.

The machines shown in FIGS. 14 and 15 may furthermore comprise means for extracting dust and/or slurry from the concrete surface, or directly from a grinding machine. For instance, an optional dust container 1560 is indicated in FIG. 15. Thus, according to aspects, at least some of the concrete surface processing machines 1310, 1400, 1500 disclosed herein comprise means for collecting dust from the concrete surface. The machines may advantageously also comprise means for weighting the collected dust and slurry. In this case the control unit 1410, 1510 can be arranged to determine an efficiency of a concrete processing operation based on the amount of collected dust and slurry. This efficiency may, e.g., be indicated to an operator on a display 1920, 2020. Also, in case the amount of generated dust and slurry decreases or otherwise goes outside of an expected range, a warning signal may be issued to an operator, since this event is indicative of a fault condition.

The concrete surface processing machines 1310, 1400, 1500 may furthermore comprise means for dispensing a liquid and/or a chemical compound onto the concrete surface. This dispensing may form part of one or more stages of the concrete processing operation. The liquid may be water used to trap dust generated during the grinding operation, e.g., in the form of a mist. The chemical compound may comprise any of, a detergent, a polishing compound, and/or some other form of surface treatment.

To summarize, there is disclosed herein a concrete surface processing machine 1310, 1400, 1500, also referred to above as a surface inspection robot, for obtaining input data 1010 indicative of one or more properties of a concrete surface 101. The machine comprises means for self-locomotion and a control unit 1410, 1510 arranged to control the means for self-locomotion. The means for self-locomotion may comprise the abrasive tools as is the case for the robots illustrated in FIGS. 2A, 2B, FIG. 13 and FIG. 15, or the means for self-locomotion can in the form of driven wheels 1460, as illustrated in FIG. 14.

The machine comprises one or more surface property sensors 1440, 1450, 1540, 1550 connected to the control unit 1410, 1510 and arranged to determine a local surface quality of the concrete surface 310. The output data from these sensors can then be used by the operator support devices discussed in connection to FIG. 10 and FIG. 12, or for other purposes, such as verifying the end result of a concrete processing operation. The local surface quality may, for instance, be indicative of the presence of scratch marks, cracks in the surface, and/or a level of surface gloss. Severe scratch marks require more grinding in order to obtain a concrete surface without marks, thus, the presence of scratch marks is likely to impact both the proposed tool selection as well as the work schedule presented to the operator or user of the user equipment 1000, 1200. In other words, the control unit 1410, 1510 is optionally arranged to compare the plurality of local surface quality values to a pre-config-ured specification, and to output a surface quality report 1010 based on the comparison.

According to aspects, the one or more surface property sensors comprises a three-dimensional (3D) camera sensor. This 3D camera may be configured to scan the concrete surface, as illustrated by the sensors 1450, 1550 in FIGS. 14 and 15. This way various defects in the surface can be detected. The detected defects can be used for refining the tool selection, an also for refining the estimated work schedule and progress. This 3D camera is also suitable for validating an end result of processing a concrete surface. Thus, one the concrete processing operation is concluded, a surface inspection robot like the robot 1310, 1400, 1500 can be used to survey the surface in order to detect any defects still remaining. In case no defects are discovered, a certifi-cate can be issued to an operator stating that the concrete surface now meets requirements.

According to aspects, the one or more surface property sensors comprises a radar sensor and an inertial measure-ment unit (IMU). The control unit 1410, 1510 can then be arranged to compensate an output signal from the radar sensor for vibration in the machine based on an output signal from the IMU. This way the signal quality from the radar is much improved, since it becomes less sensitive to the vibrations caused during operation of the surface inspection robot. A downward looking radar sensor can be used to detect defects in the concrete surface, such as cracks, pores, and the like. A downward looking radar sensor can also be used to measure the distance to the concrete surface from the sensor. This way the current wear of the abrasive tools can be determined. Thus, information regarding a current tool status, and the current progress of a concrete processing operation, can be provided to an operator, possibly via wireless link to a remote wireless device 1360 as exempli-fied in FIG. 13.

The one or more surface property sensors may also comprise a laser scanner arranged to detect defects in the concrete surface and/or a gloss sensor configured to measure a gloss level of a polished concrete surface. The gloss level can then be reported back to an operator. Requirements on gloss level may be imposed on a given concrete processing operation. A surface inspection robot can then be used to verify that the desired level of gloss has been obtained over the whole surface. If there are portions of the surface with insufficient gloss, then a notification can the trigged indi-cating the need for further polishing.

The control unit 1410, 1510 is also arranged to control a self-locomotion of the machine to determine a plurality of local surface quality values associated with respective dif-ferent locations on the concrete surface 101. This self-locomotion may be achieved either by the abrasive tools themselves, or by separate wheels 1460 arranged for loco-motion.

The surface inspection robot may further comprise a moisture sensor arranged to determine a moisture level of the concrete surface 101 and/or a temperature sensor arranged to determine a temperature of the concrete surface 101. This allows the surface inspection robot, or some external device 1360, to determine a maturity level of the concrete surface in dependence of the moisture level and/or in dependence of the temperature of the concrete surface 101. This maturity level can also form part of the input data 1010. In case the user equipment 1000, 1200 has access to concrete maturity data, the concrete processing operations can be planned with increased accuracy. For instance, some grinding steps may be best to perform at a given level of maturity. Thus, a system able to estimate current concrete maturity may optimize the onset and cessation of the dif-ferent concrete processing steps. The maturity level may also be used with advantage to determine when a smoothing or troweling operation may commence and when it should be terminated due to a too high level of concrete maturity.

The surface inspection robot optionally also comprises a durometer and/or a device for forming a scratch mark in the concrete surface, where the control unit is arranged to determine a surface hardness level of the concrete surface 101 based on the output from the durometer and/or from a sensor arranged to detect the depth of the scratch mark. Thus, a vision based sensor, or the like can be arranged to monitor the impact by the device for making scratches or other marks in the surface, and thus determine the hardness level of the surface. The hardness can also be used with advantage in determining a suitable time to start different concrete processing steps, i.e., when to start grinding by a given grit, when to start polishing, and the like.

FIG. 16 is a flow chart illustrating methods which sum-marize the discussions herein. There is shown a method for abrasive processing of a concrete surface 101. The method comprises obtaining S1 input data 1010 indicative of at least an area of the concrete surface 101, obtaining S2 a list 1030 of available abrasive tools 310, 510, 700 and information indicative of an abrading capability of each abrasive tool, and determining S3 a selection of abrasive tools from the list of available abrasive tools, such that the determined selec-tion of abrasive tools is associated with a joint abrasive capability to process the concrete surface 101.

According to aspects, the input data 1010 is indicative of a desired end result by the abrasive processing of the concrete surface 101. The method then further comprises determining S31 the selection of abrasive tools from the list of available abrasive tools, such that the determined selec-tion of abrasive tools is associated with a joint abrasive capability sufficient to obtain the desired end result.

According to aspects, at least one abrasive tool 310, 510, 700 in the list of available abrasive tools 1030 is a tool arranged extending along a wear direction D from a grinding surface G to a mounting surface M, and comprising at least two sections 410, 420, 430, 610, 620, 630, 710, 720, 730, 740 separated by a surface P transversal to the wear direction D, where the at least two sections comprise respective abrasive materials associated with different grit sizes, where the section located closer to the grinding surface G is associated with a larger grit size compared to the section located closer to the mounting surface M.

According to aspects, the method also comprises obtain-ing S11 information indicative of a respective cost for at least some of the abrasive tools in the list 1030 of available abrasive tools 310, 510, 700, and determining S32 a cost associated with the selection of abrasive tools based on the information indicative of a respective cost.

According to aspects, the method also comprises obtain-ing S12 information indicative of a respective processing time 1210 for at least some of the abrasive tools in the list 1030 of available abrasive tools 310, 510, 700, and determining S4 a work schedule associated with the selection of abrasive tools based on the information indicative of respective processing time.

FIG. 17 illustrates a control unit 1700 comprising processing circuitry 1710, a communications interface 1710 coupled to the processing circuitry 1710; and a memory module 1730 coupled to the processing circuitry 1710, wherein the memory module comprises machine readable computer program instructions that, when executed by the processing circuitry, causes the control unit to perform the different operations discussed above. The control unit 1700 may, e.g., be used as any of the device control units 1000, 1200, 1410, and 1510.

FIG. 17 also schematically illustrates, in terms of a number of functional units, the general components of the control unit 1700. Processing circuitry 1710 is provided using any combination of one or more of a suitable central processing unit CPU, multiprocessor, microcontroller, digital signal processor DSP, etc., capable of executing software instructions stored in a computer program product, e.g. in the form of a storage medium 1730. The processing circuitry 1710 may further be provided as at least one application specific integrated circuit ASIC, or field programmable gate array FPGA.

Particularly, the processing circuitry 1710 is configured to cause the floor grinder to perform a set of operations, or steps, such as the methods discussed in connection to FIG. 16 and the discussions above. For example, the storage medium 1730 may store the set of operations, and the processing circuitry 1710 may be configured to retrieve the set of operations from the storage medium 1730 to cause the device to perform the set of operations. The set of operations may be provided as a set of executable instructions. Thus, the processing circuitry 1710 is thereby arranged to execute methods as herein disclosed.

The storage medium 1730 may also comprise persistent storage, which, for example, can be any single one or combination of magnetic memory module, optical memory module, solid state memory module or even remotely mounted memory module.

The circuit may further comprise an interface 1720 for communications with at least one external device. As such the interface 1720 may comprise one or more transmitters and receivers, comprising analogue and digital components and a suitable number of ports for wireline or wireless communication.

The processing circuitry 1710 controls the general operation of the control unit 170, 240, 610, e.g., by sending data and control signals to the interface 1720 and the storage medium 1730, by receiving data and reports from the interface 1720, and by retrieving data and instructions from the storage medium 1730.

FIG. 18 illustrates a computer readable medium 1810 carrying a computer program comprising program code means 1820 for performing the methods illustrated in FIG. 16, when said program product is run on a computer. The computer readable medium and the code means may together form a computer program product 1800.

The invention claimed is:

1. An abrasive tool for a floor grinder,
   wherein the tool extends along a wear direction from a grinding surface to a mounting surface),
   wherein the abrasive tool comprises at least two sections separated by a surface transversal to the wear direction,
   wherein the at least two sections comprise respective abrasive materials associated with different grit sizes,
      wherein the section located closer to the grinding surface is associated with a larger grit size compared to the section located closer to the mounting surface, and wherein the at least two sections include at least two distinct materials stacked upon one another.

2. The abrasive tool according to claim 1, wherein a tool attachment member is arranged in connection to the mounting surface, wherein the tool attachment member is arranged to attach to a tool holder of the floor grinder.

3. The abrasive tool according to claim 1, wherein a protrusion extending transversally to the wear direction is formed in connection to the mounting surface.

4. The abrasive tool according to claim 1, wherein a height of a first segment measured in the wear direction is different from a height of a second grinding segment.

5. The abrasive tool according to claim 1, wherein the abrasive tool comprises three or more sections separated by two or more planes transversal to the wear direction, where the sections are arranged with decreasing grit size in the wear direction.

6. The abrasive tool according to claim 1, wherein a section located adjacent to the mounting surface comprises bonding material without abrasive particles.

7. The abrasive tool according to claim 1, wherein the surface forms part of a boundary segment which extends in the wear direction, and
   wherein the boundary segment comprises a material having a color or texture different from a color or texture of the at least two sections, wherein the boundary segment comprises an identification circuit arranged to be read by a corresponding reader device, or wherein the boundary segment comprises a sensor device arranged to detect when the boundary segment makes contact with the concrete surface.

8. The abrasive tool according to claim 1, wherein at least one of the at least two sections comprise a material which has been treated with a chemical composition to facilitate a concrete processing operation.

9. A user equipment arranged to facilitate abrasive processing of a concrete surface, wherein the user equipment comprises processing circuitry and a memory module,
   wherein the processing circuitry is arranged to obtain input data indicative of at least an area of the concrete surface,
   wherein a list of available abrasive tools is stored in the memory module together with information indicative of an abrading capability of each abrasive tool,
   wherein the processing circuitry is arranged to determine a selection of abrasive tools from the list of available abrasive tools, such that the determined selection of abrasive tools is associated with a joint abrasive capability to process the concrete surface, and
   wherein the user equipment determines the selection of abrasive tools based on the input data locally via the processing circuitry and a memory module to facilitate the abrasive processing of the concrete surface based on desired results.

10. The user equipment according to claim 9, wherein the input data is indicative of a desired end result by the abrasive processing of the concrete surface, wherein the processing circuitry is arranged to determine the selection of abrasive tools from the list of available abrasive tools, such that the determined selection of abrasive tools is associated with a joint abrasive capability sufficient to obtain the desired end result.

11. The user equipment according to claim 9, wherein at least one abrasive tool in the list of available abrasive tools is a tool arranged extending along a wear direction from a grinding surface to a mounting surface, and comprising at least two sections separated by a surface transversal to the wear direction, wherein the at least two sections comprise respective abrasive materials associated with different grit sizes, and wherein the section located closer to the grinding surface is associated with a larger grit size compared to the section located closer to the mounting surface (M).

12. The user equipment according to claim 9, wherein the memory module comprises information indicative of a respective cost for at least some of the abrasive tools in the list of available abrasive tools, wherein the processing circuitry is arranged to determine a cost associated with the selection of abrasive tools based on the information indicative of a respective cost.

13. The user equipment according to claim 9, wherein the memory module comprises information indicative of a respective processing time for at least some of the abrasive tools in the list of available abrasive tools, wherein the processing circuitry is arranged to determine a work schedule associated with the selection of abrasive tools based on the information indicative of respective processing time.

14. The user equipment according to claim 9, comprising a wireless interface for communicating with one or more remote devices.

15. A concrete surface processing machine for obtaining input data indicative of one or more properties of a concrete surface, wherein the machine comprises means for self-locomotion and a control unit arranged to control the means for self-locomotion, wherein the machine comprises one or more surface property sensors connected to the control unit and arranged to determine a local surface quality of the concrete surface, and wherein the control unit is arranged to control a self-locomotion of the machine to determine a plurality of local surface quality values associated with respective different locations on the concrete surface, and wherein the self-locomotion includes controlling the machine automatically without external input.

16. The concrete surface processing machine according to claim 15, wherein the concrete surface processing machine is arranged to rotate about an axis normal to the concrete surface by means for self-locomotion, wherein the control unit is connected to at least one laser range finder arranged pointing in a fixed direction from the concrete surface processing machine, and wherein the control unit is arranged to determine a boundary geometry and/or an area of the concrete surface based on a sequence of ranges obtained by the laser range finder.

17. The concrete surface processing machine according to claim 15, wherein the control unit is connected to a linear photo sensor extending transversally to the concrete surface, and wherein the control unit is arranged to detect a height of an incoming laser beam relative to the concrete surface, based on a point of incidence of the incoming laser beam on the linear photo sensor, wherein the control unit is arranged to determine topology information associated with the concrete surface based on the detected height.

18. The concrete surface processing machine according to claim 15, wherein the local surface quality is indicative of the presence of scratch marks, cracks in the surface, and/or a level of surface gloss, and wherein the one or more surface property sensors comprises a three-dimensional, 3D, camera sensor, a laser scanner or a gloss sensor.

19. The concrete surface processing machine according to claim 15, wherein the one or more surface property sensors comprises a radar sensor and an inertial measurement unit, IMU, wherein the control unit is arranged to compensate an output signal from the radar sensor for vibration in the machine based on an output signal from the IMU.

20. The concrete surface processing machine according to claim 15, wherein the control unit is arranged to compare the plurality of local surface quality values to a pre-configured specification, and to output a surface quality report based on the comparison.

21. The concrete surface processing machine according to claim 15, further comprising a moisture sensor arranged to determine a moisture level of the concrete surface, a temperature sensor arranged to determine a temperature of the concrete surface, or a radar transceiver, and wherein the control unit is arranged to determine a maturity level of the concrete surface in dependence of the moisture level or the temperature of the concrete surface, or wherein the control unit is arranged to detect cracks and pores in the concrete surface based on an output signal from the radar transceiver.

22. The concrete surface processing machine according to claim 15, comprising a durometer and/or a device for forming a scratch mark in the concrete surface, wherein the control unit is arranged to determine a surface hardness level of the concrete surface based on an output from the durometer and/or based on a detected impact on the concrete surface by the durometer and or by the device for forming a scratch mark.

23. The concrete surface processing machine according to claim 15, comprising means for dispensing a liquid and/or a chemical compound onto the concrete surface or comprising means for collecting dust from the concrete surface, and means for weighting collected dust and slurry, wherein the control unit is arranged to generate a report comprising any of the concrete surface area, concrete surface topology, concrete surface quality, wherein the report is arranged to constitute input data to a user equipment arranged to facilitate abrasive processing of a concrete surface or is arranged to determine an efficiency of a concrete processing operation based on the amount of collected dust and slurry.

* * * * *